(12) United States Patent
Rhoads et al.

(10) Patent No.: US 7,949,148 B2
(45) Date of Patent: May 24, 2011

(54) OBJECT PROCESSING EMPLOYING MOVEMENT

(75) Inventors: Geoffrey B. Rhoads, West Linn, OR (US); Tony F. Rodriguez, Portland, OR (US); Brett A. Bradley, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1160 days.

(21) Appl. No.: 11/625,162

(22) Filed: Jan. 19, 2007

(65) Prior Publication Data
US 2007/0214406 A1 Sep. 13, 2007

Related U.S. Application Data

(60) Provisional application No. 60/762,055, filed on Jan. 23, 2006, provisional application No. 60/866,033, filed on Nov. 15, 2006.

(51) Int. Cl.
*G06K 9/00* (2006.01)
*G01B 11/24* (2006.01)

(52) U.S. Cl. .......................... 382/100; 356/601
(58) Field of Classification Search .................. 382/100
See application file for complete search history.

(56) References Cited

U.S. PATENT DOCUMENTS

| | | | |
|---|---|---|---|
| 4,218,674 A | 8/1980 | Brosow et al. | |
| 4,423,415 A | 12/1983 | Goldman | |
| 4,568,936 A | 2/1986 | Goldman | |
| 4,582,986 A | 4/1986 | Stockburger | |
| 4,650,979 A | 3/1987 | Stockburger | |
| 4,675,669 A | 6/1987 | Goldman | |
| 4,677,435 A | 6/1987 | Cause D'Agraives et al. | |
| 4,686,527 A | 8/1987 | Goldman | |
| 4,689,477 A | 8/1987 | Goldman | |
| 4,748,679 A | 5/1988 | Gold | |
| 4,820,912 A | 4/1989 | Samyn | |
| 4,837,840 A | 6/1989 | Goldman | |
| 5,012,524 A * | 4/1991 | Le Beau | 382/149 |
| 5,180,192 A * | 1/1993 | Herbert | 283/101 |
| 5,325,167 A | 6/1994 | Melen | |
| 5,473,147 A | 12/1995 | Hoshino et al. | |
| 5,521,984 A | 5/1996 | Denenberg et al. | |
| 5,602,381 A | 2/1997 | Hoshino et al. | |
| 6,031,464 A | 2/2000 | Matsumoto et al. | |
| 6,421,453 B1 | 7/2002 | Kanevsky et al. | |
| 6,580,809 B2 | 6/2003 | Stach et al. | |
| 6,584,214 B1 | 6/2003 | Pappu et al. | |

(Continued)

FOREIGN PATENT DOCUMENTS

GB 2417592 3/2006

(Continued)

OTHER PUBLICATIONS

AlpVision Fingerprint press release, Sep. 25, 2006.

(Continued)

*Primary Examiner* — Hadi Akhavannik

(57) ABSTRACT

Directional albedo of a particular article, such as an identity card, is measured and stored. When the article is later presented, it can be confirmed to be the same particular article by re-measuring the albedo function, and checking for correspondence against the earlier-stored data. The re-measuring can be performed through us of a handheld optical device, such as a camera-equipped cell phone. The albedo function can serve as random key data in a variety of cryptographic applications. The function can be changed during the life of the article. A variety of other features are also detailed.

21 Claims, 9 Drawing Sheets

U.S. PATENT DOCUMENTS

| | | |
|---|---|---|
| 6,614,914 B1 | 9/2003 | Rhoads et al. |
| 6,840,721 B2 | 1/2005 | Kaule et al. |
| 6,947,571 B1 | 9/2005 | Rhoads et al. |
| 6,959,098 B1 | 10/2005 | Alattar |
| 6,987,568 B2 | 1/2006 | Dana |
| 7,194,253 B2 * | 3/2007 | Ritter et al. ............... 455/414.1 |
| 7,251,347 B2 | 7/2007 | Smith |
| 2002/0080357 A1 | 6/2002 | Dana |
| 2002/0126889 A1 | 9/2002 | Pikler |
| 2003/0012403 A1 * | 1/2003 | Rhoads et al. ............... 382/100 |
| 2003/0026448 A1 | 2/2003 | Metois et al. |
| 2003/0035564 A1 | 2/2003 | Honsinger et al. |
| 2003/0063772 A1 | 4/2003 | Smith |
| 2003/0145747 A1 | 8/2003 | Mayer et al. |
| 2003/0219145 A1 * | 11/2003 | Smith ............... 382/100 |
| 2004/0025728 A1 | 2/2004 | Adamczyk |
| 2004/0101157 A1 | 5/2004 | Stach |
| 2004/0105569 A1 | 6/2004 | Sharma et al. |
| 2004/0158724 A1 * | 8/2004 | Carr et al. ............... 713/186 |
| 2004/0232108 A1 | 11/2004 | Giori |
| 2005/0038756 A1 | 2/2005 | Nagel |
| 2005/0072326 A1 | 4/2005 | Braun et al. |
| 2005/0115425 A1 | 6/2005 | Plaschka et al. |
| 2005/0139100 A1 | 6/2005 | Franz et al. |
| 2005/0141707 A1 | 6/2005 | Haitsma et al. |
| 2005/0190914 A1 | 9/2005 | Chen et al. |
| 2005/0193909 A1 | 9/2005 | Mayer et al. |
| 2005/0210255 A1 | 9/2005 | Kirovski |
| 2005/0259819 A1 | 11/2005 | Oomen et al. |
| 2005/0262350 A1 | 11/2005 | Boutant et al. |
| 2005/0285761 A1 | 12/2005 | Jancke |
| 2006/0075237 A1 | 4/2006 | Seo et al. |
| 2006/0104103 A1 | 5/2006 | Colineau |
| 2006/0115110 A1 | 6/2006 | Rodriguez et al. |
| 2006/0151989 A1 | 7/2006 | Muke et al. |
| 2006/0200672 A1 | 9/2006 | Calhoon et al. |
| 2007/0028093 A1 | 2/2007 | Cowburn |
| 2007/0028108 A1 | 2/2007 | Cowburn |
| 2007/0165208 A1 | 7/2007 | Cowburn |
| 2008/0044096 A1 | 2/2008 | Cowburn |

FOREIGN PATENT DOCUMENTS

| | | |
|---|---|---|
| WO | WO9724699 | 7/1997 |
| WO | WO02/065782 | 8/2002 |
| WO | WO03/030105 | 4/2003 |
| WO | WO2005088517 | 9/2005 |
| WO | WO2005088533 | 9/2005 |
| WO | WO2005/106783 | 11/2005 |
| WO | WO2006120398 | 11/2006 |

OTHER PUBLICATIONS

Chen, "Certifying Authenticity via Fiber-Infused Paper," ACM SIGecom Exchanges, vol. 5, Issue 3, Apr. 2005, pp. 29-37.

Deinhammer, "The Implication of Direct Laser Engraved Intaglio Plates on Banknote Security," SPIE vol. 6075, Feb. 2006.

Matsumoto, "Evaluation Security of a Clone Preventive Technique," Optical Security and Counterfeit Deterrence Techniques III, Proc. of SPIE Co. 3973, 2000, pp. 139-152.

Pappu, Physical One-Way Functions, Science, vol. 297, Sep. 2002, pp. 2026-2030.

Pappu, "Physical One-Way Functions," MIT Thesis, Mar. 2001.

Rodriguez, "On the Use of Mobile Imaging Devices for the Validation of First- and Second-Line Security Features," SPIE vol. 6075, Feb. 2006.

Van Renesse, "3DAS—A 3 Dimensional-Structure Authentication System," IEE European Convention on Security and Detection, 1995, pp. 45-49.

Van Renesse, "Optical Inspection Techniques for Security Instrumentation," SPIE vol. 2659, pp. 159-167, 1996.

Buchanan, Fingerprinting documents and packaging, Nature, vol. 436, p. 475, Jul. 28, 2005.

Buchanan, Fingerprinting documents and packaging—supplementary methods, Nature online, Jul. 2005.

Haist, Optical Detection of Random Features for High Security Applications, Optics Communications v. 147, pp. 173-179, 1998.

Lindstrand, Angularly and Spatially Resolved Reflectometer for a Perceptually Adequate Characterization of Gloss, JIST vol. 49, Jan.-Feb. 2005, pp. 71-84.

Pappu, Physical One-Way Functions, RSA Laboratories Cryptobytes, vol. 6, No. 2, Summer, 2003, pp. 21-32.

* cited by examiner

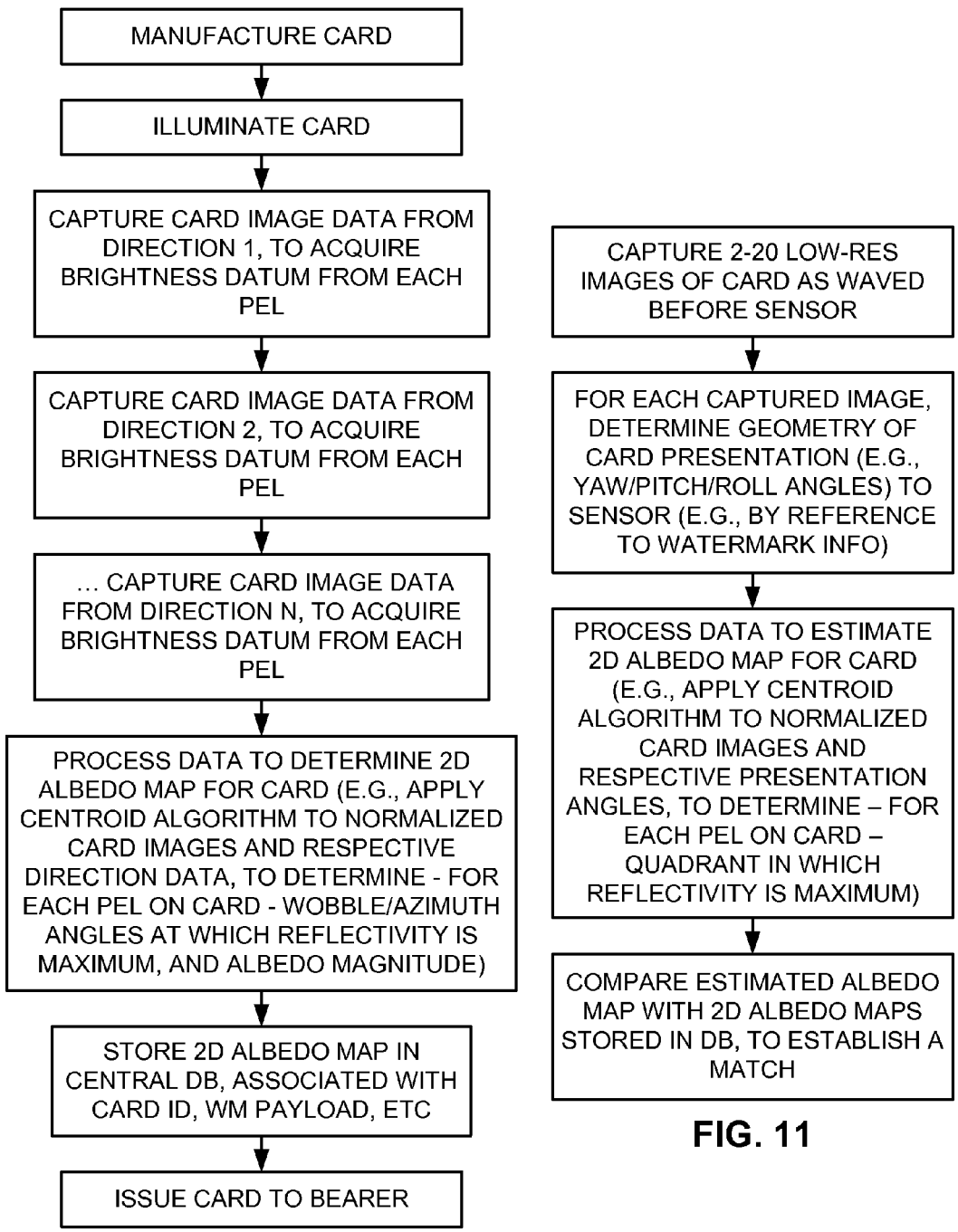

(before deformation)

(after laser deformation)

OBJECT PROCESSING EMPLOYING MOVEMENT

RELATED APPLICATION DATA

This application claims priority benefit to provisional application 60/762,055, filed Jan. 23, 2006, and to provisional application 60/866,033, filed Nov. 15, 2006.

Two other applications, with essentially the same specification, were filed by the present assignee on the same date as this application. Those other applications are entitled Methods and Cards Employing Optical Phenomena; and Capturing Physical Feature Data.

FIELD

The technology detailed herein relates—in certain aspects—to sensing optical data from an object from plural vantage points, and uses of the resulting data.

BACKGROUND

The following references detail technologies applicable in connection with applicants' work.

U.S. Pat. No. 6,584,214 discloses how three-dimensional characteristics of a complex physical structure can be used to generate a unique identifier useful, e.g., in cryptography. In effect, the physical characteristics represent the basis of a "physical one-way hash function" that facilitates derivation of an identifier based on the structure (yet the structure cannot be reproduced given only the identifier).

Related work is detailed in the March, 2001, MIT thesis by Pappu, entitled "Physical One-Way Functions," and in the related Pappu et al paper of the same name, published in the Sep. 20, 2002, issue of Science (Vol. 297, pp. 2026-2030, attached hereto as Exhibit A).

Chen et al have noted that an inexpensive physical object can serve as a cryptographic element, if a random unique structure of the object (e.g., paper fiber) is accurately quantified. ("Certifying Authenticity via Fiber-Infused Paper," ACM SIGecom Exchanges, Volume 5, Issue 3, April 2005, pages 29-37, attached hereto as Exhibit B.)

Rodriguez et al have written about use of cell phones and like devices for validation of document security features. ("On the Use of Mobile Imaging Devices for the Validation of First- and Second-Line Security Features," SPIE Vol. 6075, February, 2006, attached as Exhibit C.)

WIPO patent publication WO 2005/106783 details how the propagation of sonic vibrations through an inhomogeneous medium—such as a card with embedded irregularities—can generate data by which the medium can be uniquely identified.

A number of patent documents teach how a medium can be uniquely identified by reference to its inherent physical characteristics, such microscopic grain structure, optical characteristics, or structural characteristics. Examples include US20050190914, US20050210255, US20030035564, US20050262350, WO0065541, WO03030105 (corresponding, e.g., to U.S. applications 60/317,665, and 60/394,914), and WO03087991 (corresponding, e.g., to 60/371,073).

Arrangements in which data is represented by reference to angles (e.g., angular symbologies) are taught, e.g., in US2003026448 and US20050285761.

U.S. Pat. No. 6,987,568 details a method and apparatus for measuring bidirectional reflectance distribution function.

U.S. Pat. No. 6,421,453 shows that gestures can be employed in identification applications.

To provide a comprehensive disclosure without unduly lengthening this specification, the documents identified herein (both above and below) are incorporated by reference.

DISCUSSION

The term "secure document" conjures various concepts to the artisan, generally characterized by expensive production materials and machinery. Examples include currency formed on commercially unobtainable paper and intaglio-engraved with elaborate guilloche patterns, and driver licenses incorporating sophisticated laminates and myriad other anti-counterfeiting technologies.

More generally, however, a secure document is simply one that essentially cannot be duplicated.

Contrary to familiar notions, in one sense all documents are secure. At an atomic level, no document can be "duplicated." If, e.g., an original driver license could be atomically characterized at the time of its issuance, and the resulting massive data set stored, then this stored data could later be used as a reference to determine whether a suspect license is the original one, or an imperfect forgery.

A system built on such principles is, of course, impractical. One hurdle is to characterize the license—at the time of its issuance—at the atomic level. If such equipment existed, it would be extraordinarily expensive. A second hurdle is more confounding: similar equipment would have to be installed at every reader location (retail outlet, airline check-in, police cruiser, etc) at which authenticity of the license is to be assessed.

However, the insight that every document (indeed, every tangible article) is irreproducible at some level, allows for some interesting inquiries.

For example, how much data must be collected from an article to permit it to be distinguished from seemingly identical articles (e.g., articles produced sequentially using the same manufacturing equipment and using same source of raw materials)? Can sufficient data be collected optically, or is resort to characterizing other physical properties (chemical composition, mechanical features) required?

Consider an ID card, measuring 3.5"×2." If optically scanned at the time of its issuance using a 600 dpi scanner, it produces 360,000 samples over each square inch. If each sample is composed of 12 bits of red information, 12 bits of blue information, and 12 bits of green information, the scanning process yield 12,960,000 bits for each square inch, or 90,720,000 bits across the face of the card. This data could be stored and used as a check to determine whether a suspect card is the original. Yet experience suggests that this nearly 100 megabit data set is not sufficiently detailed for such card authentication. A counterfeiter with such a scanner and a decent printer could produce a forged card that cannot be reliably distinguished from the original (using traditional techniques) by reference to this 100 megabit data set (taking into account a margin of natural variability associated with scanner noise and other factors, i.e., the same scanner, scanning the same article twice in succession, does not produce two identical data sets, e.g., due to shot noise and other phenomena; ultimately, a formalized Bayesian decision and/or digital hash comparison process can better define the word "distinguish" in a practical setting, but for the purposes of this general introduction, this word is sufficient).

Higher resolution scanning might be employed to generate a still larger set of characterization data, but the associated costs of deploying high resolution scanners to a large number of reading stations soon makes such approaches impractical. Moreover, as scanning resolution is increased, it becomes increasingly difficult to determine whether a difference in data sets is due to different cards, or something as simple as scanner noise.

Thus, flat-scan optical characterization of the spectral density of a card or document does not appear sufficient; resort to other physical properties—and their precise characterization would appear to be required.

Or so it would seem.

Actually, the desired results may be achieved by counter-intuitive approaches. For example, instead of looking more closely at a suspect card—look at it from further away. Likewise, instead of examining the card under tightly controlled measurement conditions, sense it in a largely uncontrolled environment. And, to top things off, use a simple optical sensor. (What first appears like a recipe for disaster might instead be the seeds for success.)

In accordance with one aspect of the technology detailed herein, a simple optical sensor is used to capture sufficient data from a card to uniquely distinguish the card from another, even if both cards are designed to be identical, and are produced sequentially from the same machine.

BRIEF DESCRIPTION OF THE DRAWINGS

FIG. 7 is a flow chart outlining an illustrative technique for characterizing a card's 2D albedo map at the time of card production.

FIG. 11 is a flow chart outline one illustrative technique for estimating a card's 2D albedo map at a reader station.

DETAILED DESCRIPTION

For expository convenience, the following specification focuses on driver licenses. However, it should be understand that the principles herein can be used with tangible articles of any time (e.g., passports, paper currency, birth certificates, legal documents, medical records, computer storage media, etc.).

Figure 1:
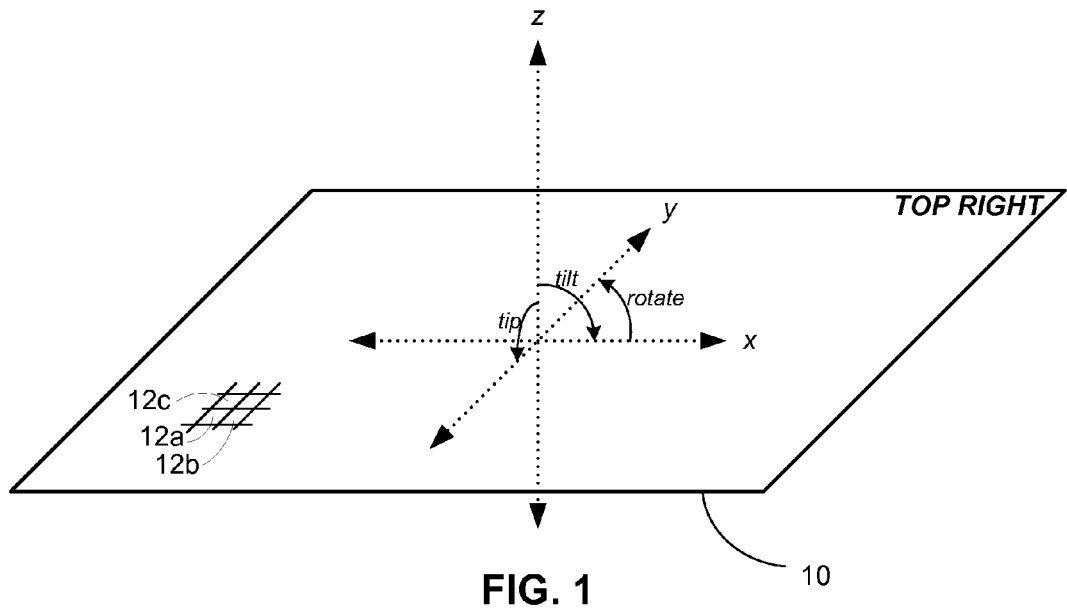
FIG. 1 shows an ID card, and an associated geometrical reference system (comprising x, y, z, tip angle, tilt angle, and rotation angle).

FIG. 1 shows the top face of a driver license 10, and one geometrical frame of reference with which certain of the features detailed below may be described.

Also shown in FIG. 1, in the lower left corner, are "a-pels" 12a, 12b, 12c ("albedo picture elements") that may be imagined as extending across the face of the card. These a-pels each correspond to an excerpt of the card face as sensed by an imaging system. (For clarity's sake, the a-pels are not to scale. They might more realistically be on the order of 0.1 or 1.0 millimeters on a side, or somewhere under 1,000 to over 100,000 a-pels per square inch of card surface.)

In a gross sense, generally flat surfaces typically exhibit a Lambertian reflectivity profile as a function of viewing angle toward that surface. That is, the maximum reflection of light from the surface occurs along the axis perpendicular to the surface (i.e., axis z in FIG. 1). However, if examined in more detail (e.g., on a per a-pel basis), it is found that the angle of maximum reflectivity typically diverges somewhat from this ideal. This divergence—shown as a "wobble" angle in FIG. 2, may be on the order of a few tenths of a degree in certain materials, but on the order of several degrees, or several tens of degrees, in other materials.

This direction at which light maximally reflects from an a-pel may be characterized by the wobble angle (i.e., the divergence from the z axis), and also by azimuth. Azimuth—measured within the plane of the card—may be regarded as the direction towards which the maximally-reflected light "leans."

Figure 2:
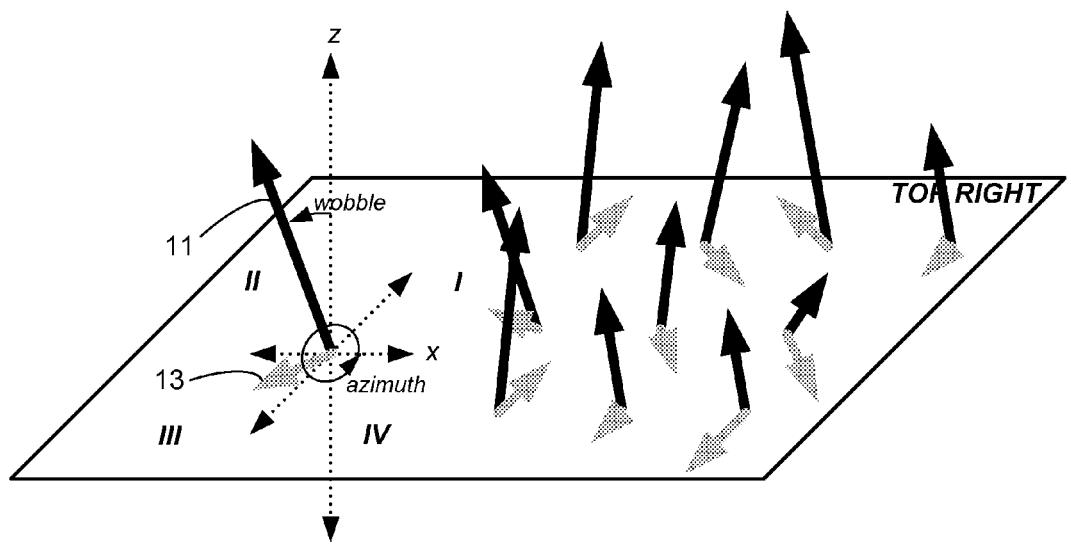
FIG. 2 shows the card of FIG. 1, with another geometrical reference system (x, y, z, wobble angle, and azimuth angle), and showing how a centroid of reflection for different a-pels on the surface of card is not always oriented along the z-axis, but rather typically wobbles, e.g., over a range of 0-20 degrees, and over a different azimuth angles.

In FIG. 2, the direction of maximum reflectivity for each a-pel is shown by a bold vector (arrow) 11. The grey arrow 13 beneath is a projection of the vector 11 onto the card's surface, and indicates the azimuth angle for each vector. As can be seen, the reflectivity vectors 11 associated with different a-pels in FIG. 2 have generally random wobble and azimuth angles.

Collectively, the reflectivity vectors 11 shown in FIG. 2 are essentially unique to any item. Like a fingerprint, they can be used to characterize the item, and distinguish it from all others (even "copies" that appear on close inspection—using classic flat-bed scanning or single-direction viewing—to be identical).

In addition to having wobble and azimuth angles, each of the vectors 11 in FIG. 2 is also characterized by length. The length of each vector indicates the magnitude of light reflected from a corresponding a-pel. The magnitude of reflected light can be a function of several factors. One prominent factor is the color of the surface: an a-pel that is substantially white reflects more light than a a-pel that is substantially black. When a flatbed scanner, or a camera, images an object, the pixel data that it captures, generally speaking, is an array of a-pel magnitude data.

A scanner or camera does not capture data from which, e.g., wobble or azimuth angles can be determined. Thus, in optically characterizing a card, a scanner captures only one dimension of data: magnitude data. Two further dimensions of independent data—wobble angle and azimuth angle—are ignored. By paying attention to these further dimensions of data, exponentially-improved abilities to identify an item—and distinguish it from others—are achieved. (A three-dimensional cylinder, viewed in only two dimensions, may appear as a rectangle, a circle, an ellipse, or a more complex shape—depending on the two-dimensional plane. Such ambiguities are easily resolved by increasing the dimension by one. Here the dimension can be increased by two.)

Figure 3:
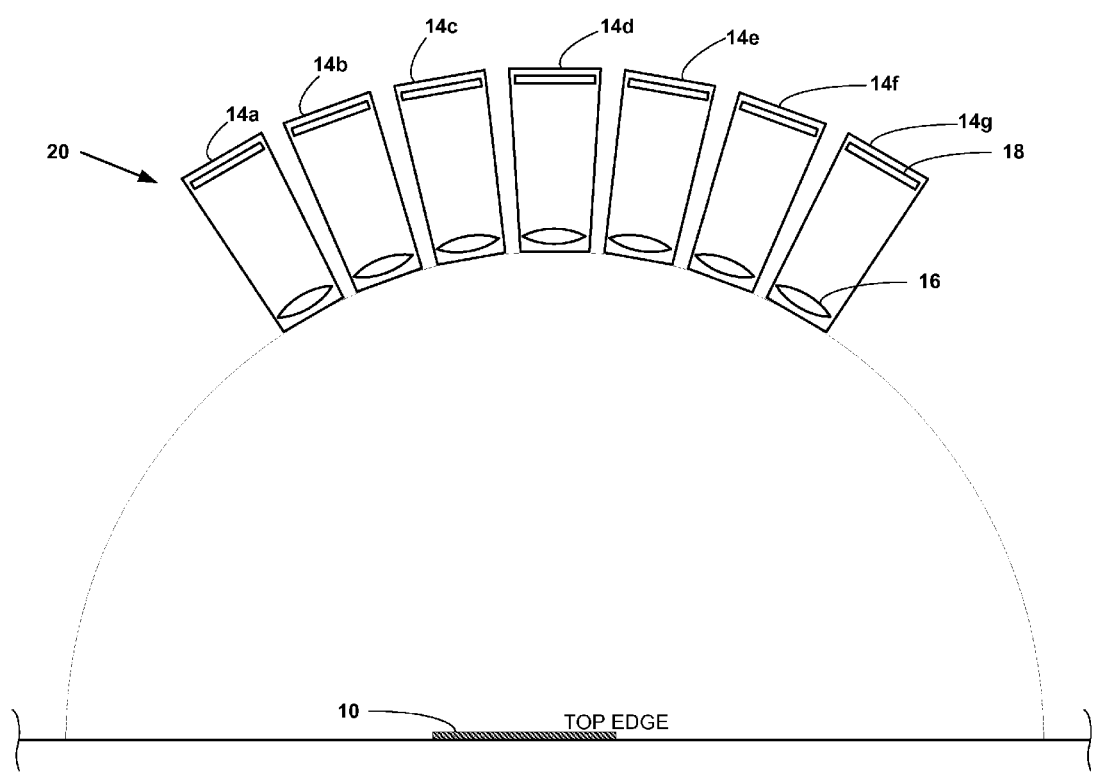
FIG. 3 is a schematic section view (passing through depicted y-axis in FIG. 1) showing part of an apparatus 20 for capturing card image data from different directions, at the time of card production.

A first task, then, is to capture the multi-dimensional data that characterizes the card. FIG. 3 shows part of an apparatus 20 for doing so.

Apparatus 20 comprises an array of cameras 14 disposed above a card 10. The card may be placed on a stage, or it may be held in position by a pick-and-place robot system.

Each camera 14 includes a lens 16, and a 2D image sensor 18. The image sensors may comprise, e.g., 1-5 megapixel CCD or CMOS sensors, as are customarily used in digital cameras.

The cameras are spaced at known locations relative to the card. In the sectional view of FIG. 3, seven cameras, 14a-14g, are shown—each positioned in the y-z plane of the card, at 10 degree spacings. Additional cameras (not shown) may be positioned in the x-z plane of the card, with similar angular spacings.

Desirably, images of the card are captured from a variety of perspectives. Basically, the idea here is to sample the reflectivity function of each a-pel on the card from a number of different directions, and use the sampled data points to determine (i.e., estimate) the approximate wobble and azimuth angle at which reflectivity is maximum. The resulting data may be regarded as the 2D (wobble/azimuth) albedo function across the card. (Note: the scientific literature tends to explicitly add the phrase "bi-reflectance" or "bi-directional" to the word "albedo"; most of this disclosure will implicitly include this directional aspect of the word "albedo".)

The FIG. 3 arrangement may comprise an array of 15 cameras, in an "X" configuration, each placed along a hemispherical surface over the card. Or the depicted arrangement may comprise 49 cameras, in a 7×7 array, warped to fit over the hemispherical surface. Lesser (or greater) numbers of cameras can alternatively be used (e.g., "X" patterns employing 5 or 10 cameras, or square arrays of 9 or 16 cameras). A minimal arrangement may comprise just three or four cameras, e.g., each viewing the card from an oblique angle of 15 degrees, and spaced every 120 or 90 degrees, respectively, around the object.

It is not necessary that the cameras all be equi-distant from the card. Nor is the spacing critical. In typical arrangements, lens-to-card distances on the order of 3"-30" inches may be used, although greater and lesser distances are also possible. (Especially when the card is imaged from short distances, compensation for parallax effects may be desirable. For example, the viewing angle for camera 14g may not be 30 degrees for all a-pels across the card. However, this effect is easily determined and can be taken into account when determining the wobble and azimuth angles.)

Nor is it required that the cameras be disposed in a regular array. Some advantages can accrue by stochastic sampling, i.e., by sampling from random directions.

In actual practice, cost and mechanical considerations may dictate that a lesser number of cameras be used. In one alternative, a single camera is used, in conjunction with an array of mirrors. Either the camera, or the mirror system, is moved as necessary to capture a sequence of different card images—each from a different direction.

Yet another arrangement is to position the card on a tip/tilt table, beneath a single camera. The card can be sequentially moved to a number of different positions relative to the camera, and an image is then acquired from each different card-camera presentation angle.

FIG. 3 does not show an illumination source, and the particular illumination source used is a secondary matter (i.e., of signal-to-noise ratios on obtaining wobble/azimuth signature data), but not of primary concern, where a variety of light sources should all suffice. Ordinary office lighting can potentially suffice—provided care is taken that the camera systems do not shadow the card and produce measurement-system artifacts. Or the apparatus 20 can include one or more controlled light sources. Generally, lighting from above the card surface is desired. Diffuse lighting can be used, but may tend to blur the directional reflectivity of a-pels on the card surface and tend to reduce the wobble amplitude of the resultant wobble peaks.

In some arrangements, polarized light, and/or polarizing filters at the sensors, can be used to further characterize the card's albedo function. Similarly, the albedo function may be sampled at different wavelengths of light. Both of these approaches can provide significant practical extensions of the basic principles of this disclosure, but they are not necessary for basic enablement.

Figure 4:
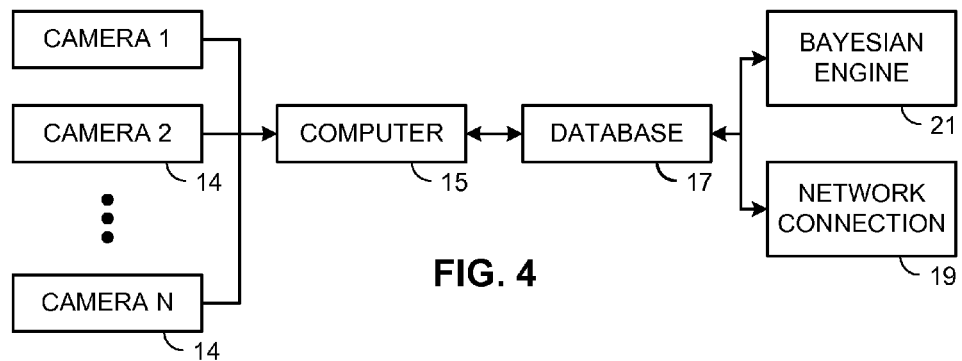
FIG. 4 is a block diagram of apparatus 20.
Figure 5:
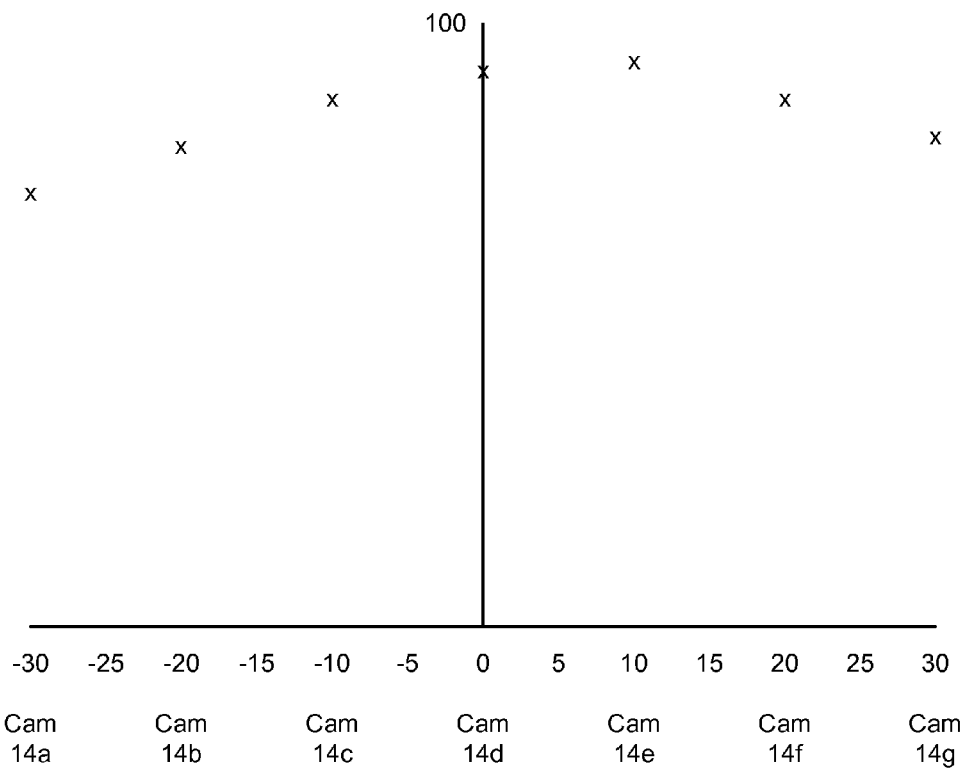
FIG. 5 is a plot showing the intensity from a sample a-pel as measured at different viewing angles.

FIG. 4 shows the magnitude of light reflected from a particular a-pel 12a on the card, as sensed by cameras 14a-14g, at respective angles of −30, −20, −10, 0, 10, 20, and 30 degrees along the y-z plane.

Light reflected from a given 'pel' may be imaged onto a 3×3 patch of pixels in directly-overhead camera 14g, but may be imaged onto only 2×3 patches of pixels in cameras 14a and 14g. Intervening cameras 14b, 14c, 14e, and 14f may have fractional rows/columns of photosensors illuminated by light reflected from the a-pel. With knowledge of the CCD layout (e.g., the dimensions of each component photosensor, and the border between photosensors), and the positioning of the cameras, such effects (e.g., fractional illumination) can be compensated-for (e.g., by weighting the contributions from different photosensors differently in aggregating the net illumination reflected from an a-pel. The aggregate illumination from an a-pel may thus range in value from zero to 2295 (the latter being a full 8 bit signal of 255, summed across 9 fully-illumined pixels).) For convenience of notation, this aggregate is represented in FIG. 4 on a scale of 0-100.

From inspection (i.e., by imagining a curve connecting the depicted sample points), it appears that the reflectivity function from sample a-pel 12a has a peak at about 6 degrees. However, the curve defined by FIG. 4 is just one slice through the reflectivity function's 3D shape (wobble/azimuth/magnitude). Other cameras—viewing the a-pel from positions off the axis of cameras 14a-14g, are needed to more fully characterize the a-pel's reflectivity function, or at the very least the general location of the albedo peak. Even with just the data from FIG. 4, however, we know that the reflectivity function "leans" towards the top edge of the card. (Unknown, from this data, is whether it leans also towards the left or right edges of the card.)

Given sample data from a set of non-collinear viewpoints, a centroid algorithm can be applied to mathematically determine a maxima of the a-pel's reflectivity function, in wobble angle, azimuth angle, and magnitude. This process can be performed by the computer 15 of FIG. 4. (Computer 15 can also serve other roles, such as being the "decisionmaker" that adjudicates whether cards sensed by reader 30 are genuine.)

A statistical analysis of the wobble angles from different a-pels across a card is expected to show a generally Gaussian distribution (though significant departures from true Gaussian should cause no problem, in any event), centered about zero degrees, and with a standard deviation on the order of between 1 and 15 degrees, depending on material.

In FIG. 3, the cameras span a range of angles, ±30 degrees, that is larger than the vast majority of wobble angles. Having at least one camera on each side of an a-pel's wobble angle helps refine the accuracy by which the wobble angle can be determined (e.g., by the centroid algorithm). However, this is not a requirement. For example, samples taken from cameras at 0, 6 and 12 degrees can nonetheless allow estimation of a wobble angle of, e.g., 15 or 20 degrees.

When a driver license is manufactured, e.g., by equipment at a state Department of Motor Vehicles (DMV) office, or at a central manufacturing facility, the license desirably is characterized by an apparatus 20 like that shown in FIGS. 3 and 4 prior to being issued to the owner (which may be by mailing, in the case of a central manufacturing facility). In some processes, such apparatus can be included at the end of the manufacturing process. The resulting data is stored in the database 17 of FIG. 4.

In one arrangement, the albedo data is stored as a series of records, each indexed by the a-pel's respective row and column number. If each a-pel is 0.5 millimeter on a side, the albedo function for a driver license may comprise 100 rows by 175 columns of data, or 17,500 a-pels total. Each record may store the wobble angle for that a-pel, together with the associated azimuth angle, and also the magnitude.

More or less data can, of course, be stored. For example, in some arrangements the magnitude data may not be stored. In another, either the wobble angle or the azimuth angle may not be stored.

Figure 6:
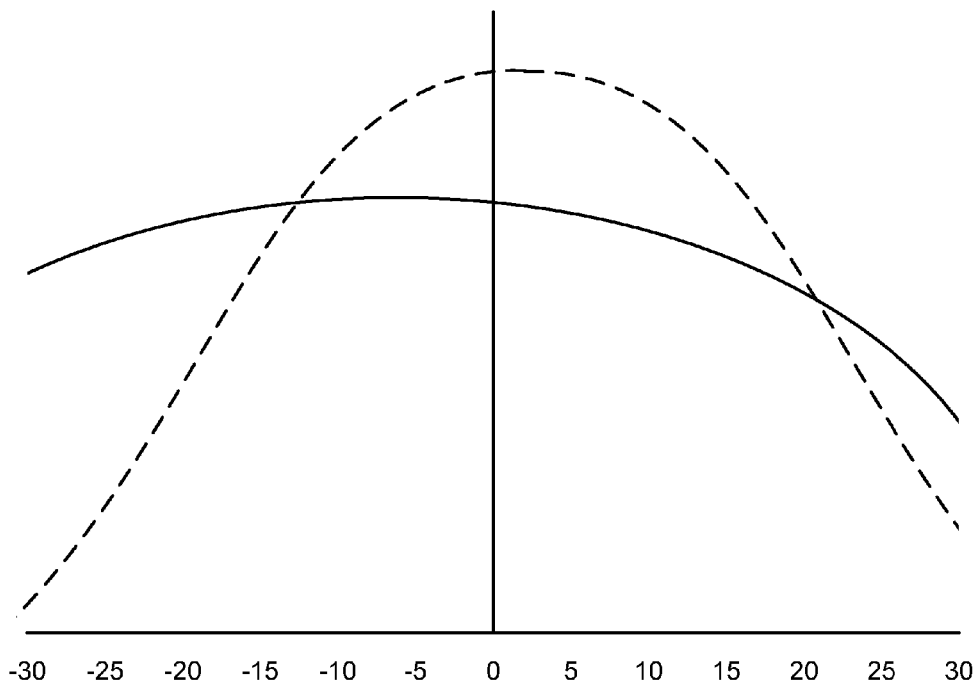
FIG. 6 shows different reflectivity functions.

In still other arrangements, more data is stored. The albedo function for each a-pel may be described not just by the 3D coordinates of the endpoints of the vectors 11 shown in FIG. 2, but also by the 3D volume of the reflectivity function. That is, the light reflected from an a-pel may be narrowly concentrated along a vector 11 (like a spotlight function), or it may form a broad volume, with lots of spread about the vector (like a floodlight function). A slice of a spotlight-like reflectivity function volume is shown by the dashed curve of FIG. 6; a slice from a more floodlight-like reflectivity function volume is shown by the solid line.

In one arrangement, the raw data from all of the cameras is stored in the database—characterizing the 3D volume reflectivity function at different sample angles. In another arrangement, a curve fitting algorithm is applied to estimate a 3D model of the reflectivity volume from the sample points, and the parameters of this model can then be stored. Furthermore, a low-order polynomial fit to the volume can be removed from the data, leaving only the higher order "unique structure" as a very subtle form of characterizing the volumes. Such possibilities tend to go beyond what mass-produced cards such as driver's licenses may contemplate as a practical matter, and point more toward higher sensitivity applications such as airport security and the like.

The database 17 in which the albedo data is stored can comprise the DMV's existing licensee database, e.g., including name, age, driving restrictions, photo portrait, etc. Or it can comprise a separate database.

Driver licenses are typically encoded with machine-readable information, such as digital watermarks, bar codes and RFID data. The information conveyed by the machine-readable data may also be stored in the database with the albedo measurements, together with other information, such as a card ID.

The exemplary card characterization process detailed above is set forth in the flow chart of FIG. 7.

After characterization, the license is issued to the user. It then goes into the user's wallet or purse and begins a life of abuse—being scraped, worn, washed, etc. Eventually, it is pulled from the wallet and presented as an ID credential, at a reading station. (The reading station may be at an airport security checkpoint, at a liquor store, in a police cruiser, at a building access, etc.)

Desirably, each reader station is relatively inexpensive, and does not require much training to operate. One version of a reader station 30 (FIG. 8) is a conventional personal computer 34, equipped with a single camera 32 and a network connection 36.

The camera 32 need not be a carefully characterized measuring instrument; a simple webcam will suffice. One popular web cam is the Creative "Live Cam Voice" model, which retails for less than $100, and has a 1.3 megapixel sensor. Others include the Creative "WebCam Live! Ultra" model (which includes a 1024×768 sensor), and the Logitech "Quickcam Pro 4000" (which includes a 1280×960 pixel sensor). These webcams all can capture 30 frames of video per second, at a resolution of 640×480 pixels or higher.

Figure 8:
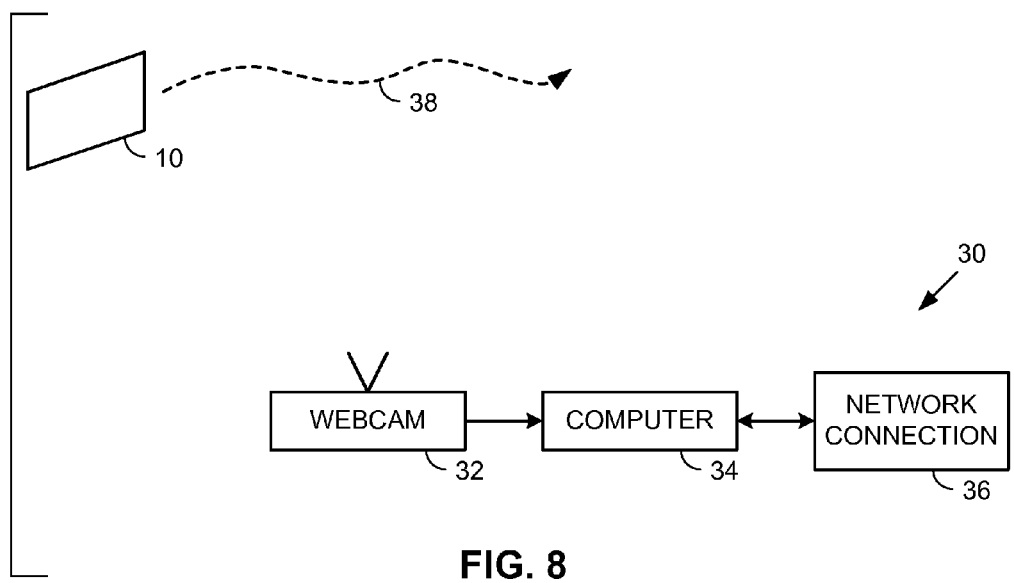
FIG. 8 is a block diagram of a reader station 30, with a card being waved in front of a webcam.

To present a card 10 for reading, the user simply waves the card in front of the webcam (as shown by the wavy dashed line in FIG. 8, which may be termed a "swoop"). The webcam captures multiple frames of image data depicting the card, e.g., one every 0.033 seconds.

As the card moves across the webcam sensor's field of view, it presents different perspectives, i.e., the webcam captures frames of image data from different angles. Whereas in the card characterization apparatus 20 of FIG. 3, plural cameras capture several perspectives of image data from a stationary card, in the reader arrangement 30 of FIG. 8, a single camera captures several perspectives of image data from a moving card.

The data acquired by reader station 30 does not compare—in quality—to that captured by characterization apparatus 20. However, it is nonetheless more than sufficient—in conjunction with the earlier acquired information stored in database 17—to discriminate the card from even "perfect" counterfeits.

Figure 9A:
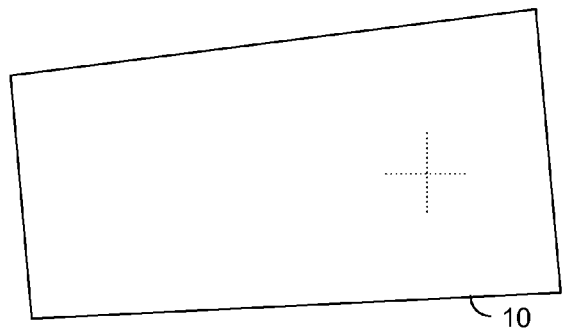
FIGS. 9A-C, and 10A-C, show successive frames of how a card might be viewed by an optical sensor at a reader station, when the card is waved before the sensor by a user.
Figure 9B:
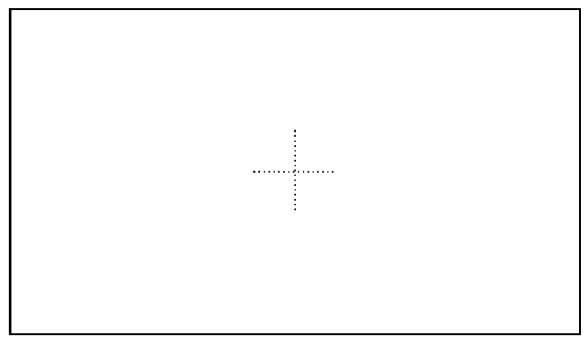
Figure 9C:
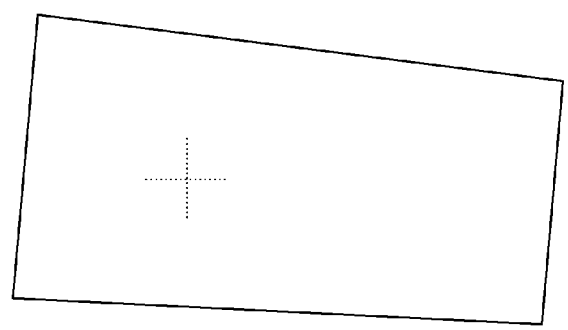

FIGS. 9A, 9B and 9C show a sample sequence of images that may be captured by reader station webcam 32. (The center of the webcam's field of view is shown by the dotted +.) In FIG. 9A, the left edge of the card is further away from the webcam, so appears fore-shortened. The card is likewise rotated a bit to the left. In FIG. 9B, the card is squarely presented before the webcam. In FIG. 9C, the right edge of the card is further away from the webcam, and the card is rotated a bit to the right.

In FIG. 9B, a frame is captured with the card directly facing the camera (i.e., the card is oriented with its z-axis passing through the lens of the webcam). This is not necessary. As long as the front of the card comes within about 10 to 20 degrees of facing the camera—at some point during its travel—the card's 2D albedo function may be satisfactorily estimated.

(It is not necessary that card be entirely within field of view in each frame; useful data can be obtained even if only if part of the card is visible.)

Figure 10A:
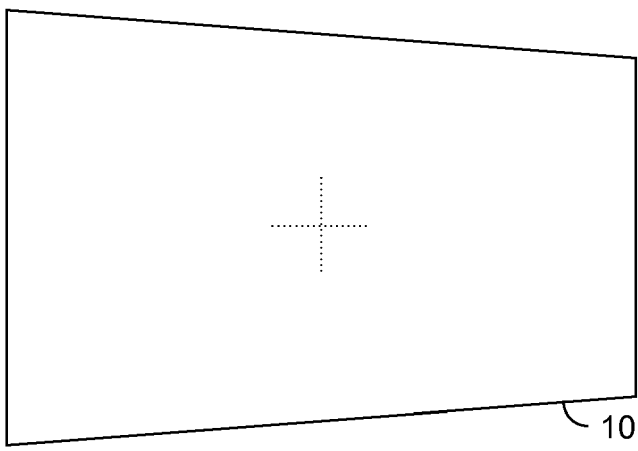
Figure 10B:
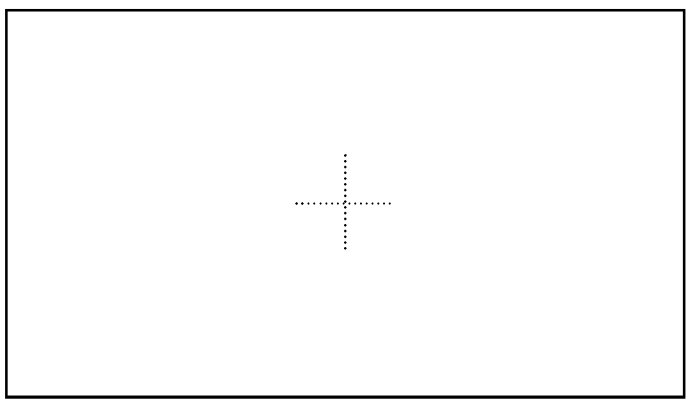
Figure 10C:
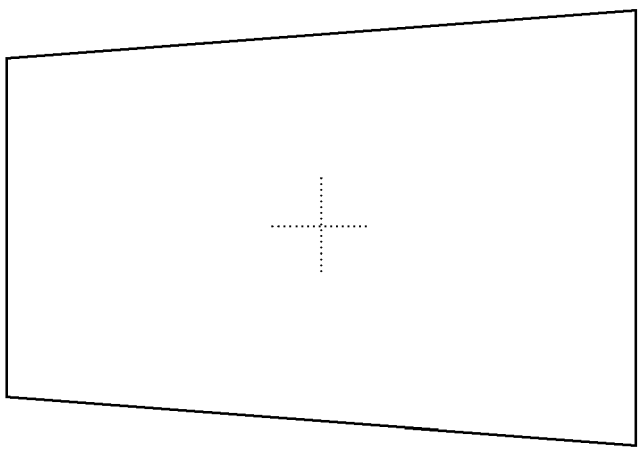

FIGS. 10A, 10B, and 10C show another sample sequence. Here the card is not laterally moved past the camera. Instead, it is simply tilted to different orientations.

Because the card in FIG. 10 is moved about just a single axis (i.e., the "tilt" axis in FIG. 1), the image samples acquired by webcam 32 likewise fall along a common axis. Although the card's albedo function can be estimated with such data, a better estimate is obtained if the card is moved around both the tip and tilt axis, as it is being waved in front of the webcam.

When the card 10 was originally characterized by apparatus 20, the measurements were taken in a precisely defined geometrical reference frame, e.g., in which the card was located at a known position relative to the cameras. The 'wave' of the card in front of webcam 32 does not enjoy this advantage. Nonetheless, the geometry of the 'wave' can still be precisely assessed. (Note: To be a bit more precise, the card will be presented to the camera across a series of frames, with each frame occupying a generally unique angular direction of the camera relative to the perpendicular of the card, thus producing a form of "track" through angular space, where from a consumer's or user's perspective waving the card in front of the camera, the term "wave" is a bit more intuitive).

A watermark carried by the card can play a key role here. The preferred watermark includes a steganographic calibration (e.g., reference or subliminal grid) signal by which affine distortion of the imaged card can be accurately quantified. (Examples are given, e.g., in U.S. Pat. Nos. 6,614,914 and 6,580,809; in publications US US20040105569 and US20040101157; U.S. Pat. No. 6,959,098 teaches how distortion can be characterized by such watermark calibration signals in conjunction with visible image features.) From this affine distortion information, the 6D location of the card (x, y, z, tip, tilt, rotation) relative to the webcam can be determined.

In processing the frames of image data captured by webcam 32, computer 34 thus starts by examining each frame for watermark information, and characterizing the position of the card depicted in such frame by reference to such information. With this position information, the angle from which the sensor views each a-pel in each frame can be determined. (Again, parallax correction may be appropriate.) Once each frame of card data is associated with its respective viewing angles, the reflectivity of different a-pels can be assessed at different angles—using a procedure like that detailed in conjunction with apparatus 20. That is, the intensities of reflected light sensed from a given a-pel—viewed from different perspectives—can be applied to a centroid algorithm to estimate the wobble and azimuth angles at which such a-pel reflectivity is maximized. Given that the geometry of measurement is significantly less controlled than during the production process, the precise algorithms for estimating wobble peaks and angles is inherently much noisier but nevertheless still quite valid.

The resulting "random track sample" of the 2D albedo map for the card can be sent over the network, and compared against the albedo maps stored in database 17. Despite the many degradations to which the card may have been physically subjected since its manufacture and characterization, the set of albedo data acquired by reader station 30 will correlate, and will correlate strongly, with only one set of albedo data in the database. The card to which it corresponds establishes its true identity. This approach represents the complete data version of authentication, essentially boiling down to sending the database all captured frames of data (or at least heavily compressed frames). Practical situations (and generally not-for-free bandwidth considerations on communication channels) point toward finding data economies at the camera head which can on the one hand greatly reduce the data volume required to be sent to the database, while at the same time maintaining the essential albedo content required for formalized distinguishability testing processes.

(The assessment of geometric orientation, and estimation of the 2D albedo map, can be performed by computer 34, but need not be. In other arrangements, the raw image data collected by reader 30—or a derivative thereof—can be transmitted to remote computer 15 for such processing.)

Given the simplicity of the reader station 30, it is unlikely that the 2D albedo data it collects will be as accurately, and as finely, resolved as that produced by apparatus 20. However, such levels of accuracy and resolution are not required.

For example, instead of characterizing the reflectivity of each a-pel's wobble and azimuth angles to two or three significant figures (e.g., 0-90 degrees and 0-360 degrees), as might be achieved by apparatus 20, a relatively coarser estimate may be made. For example, referring to vector 11 in FIG. 2, the reading station computer 34 (or computer 15) may simply quantify the vector as leaning into one of four quadrants: I, II, III or IV (northeast, northwest, southwest, or southeast). In this arrangement, each a-pel is associated with just a two-bit datum. This abbreviated data set can likewise be sent to database 17 for comparison against the earlier-acquired measurements, e.g., by a Bayesian engine 21. Again, only one previously-characterized card will highly correlate with such data.

There is nothing magic about quadrants. The reflectivity may be represented as a single bit (e.g., leans north or south; or leans east or west). Or it may be represented with higher precision (e.g., falling into one of eight 45 degree swaths). Etc.

(Typically, the 2D albedo map acquired by apparatus 20, and stored in database 17, will be two- to ten-times higher in resolution than the albedo map data collected at the reader station 30. To perform the correlation, the finer a-pel data in database 17 can be combined—across several small a-pels—to yield a vector sum corresponding to a larger a-pel, of the sort estimated by reader 30.)

The reader station may provide audio or visual feedback to the user, to confirm that the user's wave of the card was satisfactory. If the card didn't move enough, e.g., if it didn't provide image viewpoints differing by at least a threshold amount (e.g., 5 degrees, 10 degrees, or 20 degrees), feedback might not be provided. If the card was moved so quickly that too few frames were captured (or the frames were too blurry), feedback might not be provided. Likewise if the card movement was outside the sensor's field of view too much. If no fault is noted with the image capture, feedback indicating a proper wave can be provided.

The data returned by the Bayesian engine 21 can take different forms. It could simply give a "green light" indication to the reader station, indicating that the card matched one in database 17. (Since the 2D albedo profile is so unique, details of the match may not be necessary; there is essentially only one possibility—the card is the one it purports (e.g., by its text or watermark or barcode) to be.) In other arrangements, the remote computer 15 can return to the reader station 30 information about the card, or its bearer, obtained from database 17 (or other database).

In a particular arrangement, the watermark conveyed by the card is used not just for geometrical orientation purposes, but is also decoded by reader station 30 to provide an initial assessment of the card's ID. That is, it may convey the name of the user, or their driver license number. This decoded information may be sent to the database 17 with the albedo data. In this case, the database's task is simplified. It identifies the card in its storage issued to that user, or with that driver license number. Then a simple comparison is performed between the reference albedo map stored for that card, with the albedo map estimate provided by reader 30. If they correlate, the card is valid. (Other machine readable data may be used for similar purpose, e.g., bar code, RFID, etc.)

(The watermark may be read from an aggregate image, produced by combining several of the sampled images, after correcting each for affine distortion. Technology for combining low resolution images by reference to encoded digital watermark signals, so as to yield a higher quality image, is taught, e.g., in published U.S. patent application 20030002707.)

The 'wave' of the card in front of the webcam may result in the capture of 10-30 images, depending on the speed of movement. Generally speaking, the more images, the better. In some arrangements, however, it may be desirable to limit the number of images processed, e.g., to a maximum of 12. In deciding what images to keep, a variety of criteria may be employed.

For example, if two images present essentially the same perspective of the card, then one may be discarded, or at least optimally averaged into the other taking account of slight affine transformation changes. Similarly, if any image suffers a technical defect—such as glare or undue blur, it may be discarded too. (Image sharpness may be estimated by transforming part or all of a captured frame of image data into the frequency domain, and determining the amount of high frequency energy). Images that present the card at a too-oblique angle (e.g., more than 30 or 45 degrees) may also be discarded.

In an alternative reading arrangement, the card is laid (or held) stationary, and a camera is waved over it. The camera in such arrangement may be a cell phone. In this arrangement (as in others), the raw captured image data can be transmitted to a separate (e.g., remote) computer device for processing, or it can be processed by the same device used in the capturing of the data.

Figure 12A:
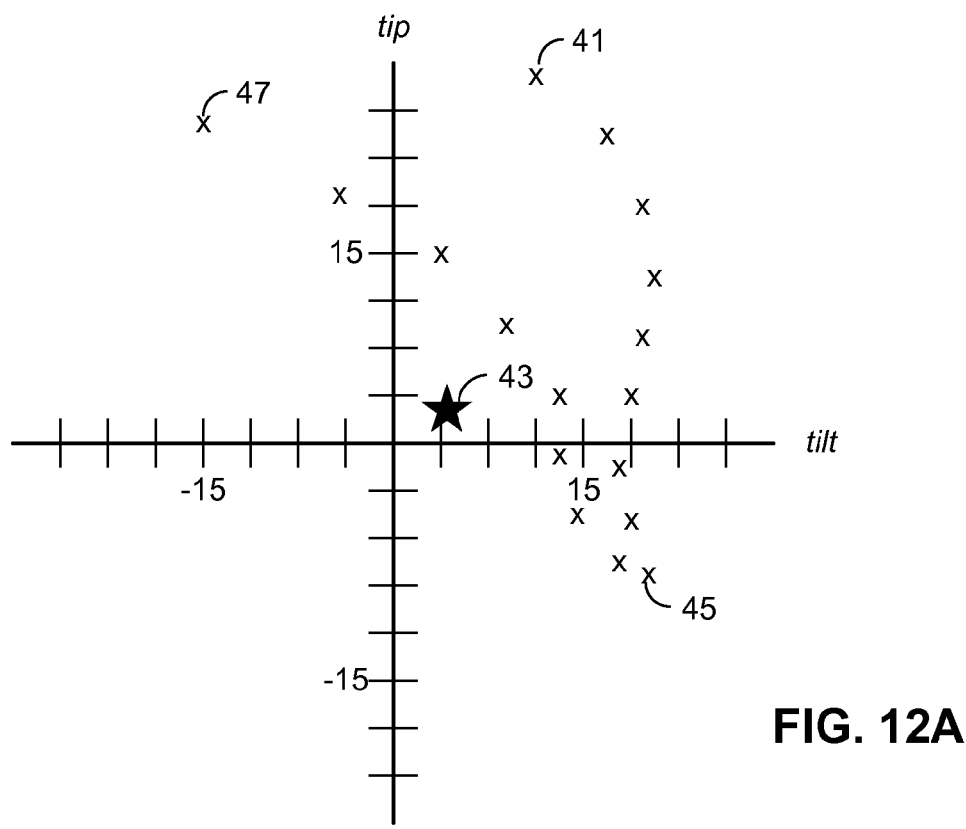
FIGS. 12A and 12B show plots detailing a "wave" of a card in front of a web cam sensor.

FIG. 12A details one "swoop" pass of a sensor over a card (or a card in front of a sensor). Each 'x' represents the orientation of the card relative to the sensor at a sample instant. The illustrated plot is shown in the tip/tilt frame of reference (with 0/0 indicating that the card's z-axis is passing through the sensor lens).

At the first sample instant 41, the card is oriented with a tilt of about 12 degrees, and a tip of about 29 degrees, relative to the sensor. Subsequent samples are taken at different orientations. At each orientation, the brightness of the a-pels are sensed.

The star FIG. 43 in FIG. 12A shows the tip/tilt at which the reflectivity from a particular a-pel 12a is maximized. At all other points on the graph, the brightness reflected from this a-pel is less than the brightness that would be sensed at position 43. By sampling the intensity of the 2D albedo profile at all the 'x' points, however, the centroid algorithm allows estimation of the location of maxima 43.

It may be noted that the sample points in FIG. 12A define a two-part 'swoop'—the first going from sample 41 to 45, and the second going from sample 45 back up to 47. The samples near 45 are relatively closely spaced, indicating that the sensor (or card) movement is slowing. The fact that the swoop generally reverses direction indicates that the sensor (or card) movement similarly generally reverses its movement for the second part of the swoop.

(A two-part, generally-reversing, swoop isn't necessary; a one-way, unitary swoop can also be used. However, the former is preferred. A unitary swoop generally characterizes the shape of the 2D albedo profile along just one of its dimensions. The second part of a generally-reversing swoop (provided it isn't identical to the first part) provides samples spaced in another dimension of the albedo profile—allowing the profile to be characterized more accurately.)

Figure 12B:
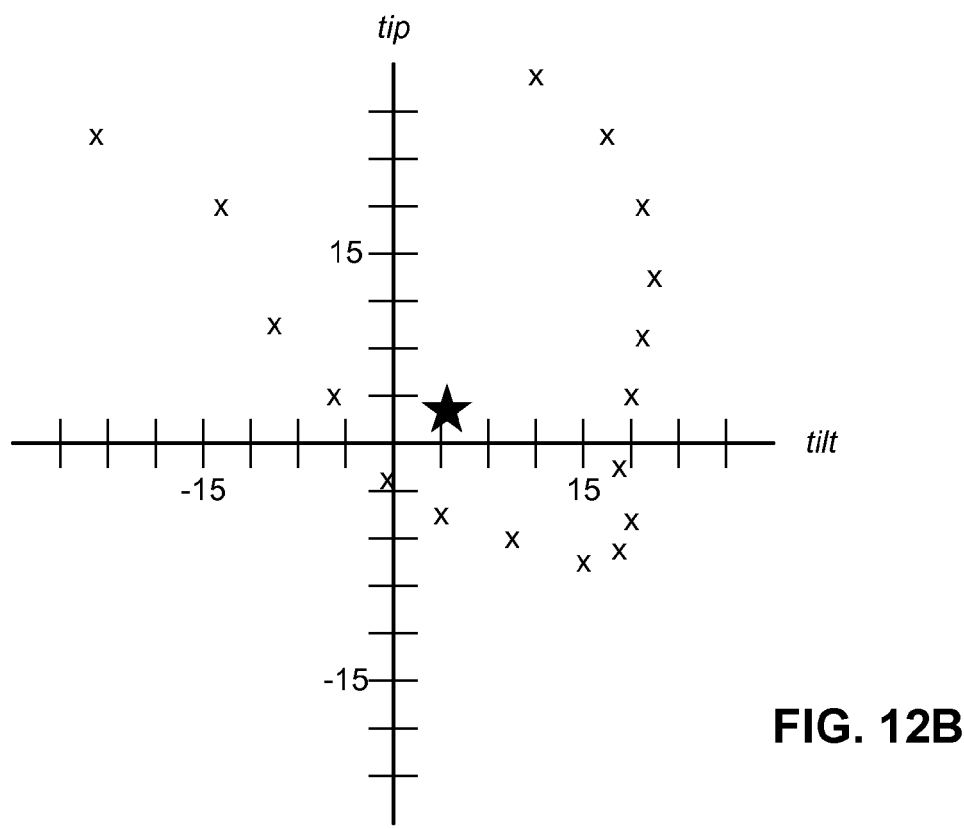

Note that all of the samples in FIG. 12A are on the same side of maxima 43. This will be the typical case. (Also typical is that the movement will usually not provide a sample directly at the maxima point 43 for a-pel 12a.) Preferable—although not necessary—is for the second part of the 'swoop' movement to take samples on the opposite side of the maxima. Such a sampling arrangement is shown in FIG. 12B. By sampling the 2D albedo profile on two sides of its maxima, the shape of the profile—and thus the location of the maxima—can more accurately be determined.

Although the calibration signals steganographically encoded with the preferred digital watermark are highly useful in determining the geometry of card-presentation-to-webcam, this geometry can be estimated by other arrangements. For example, visible features can be identified on the imaged card (e.g., by pattern matching algorithms), and the distortion of such features from their known shapes/dimensions can be used to infer card position. Likewise, if the outer rectangular dimensions of the card are known (e.g., 2" and 3.5"), edge-finding algorithms can be employed to identify the card edges, and these features can again be used to estimate card orientation relative to the webcam. (Such arrangements are shown, e.g., in U.S. Pat. No. 6,959,098.)

Likewise, although the foregoing description did not make use of watermark data by apparatus 20 to precisely characterize position of the card, such information is generally helpful and desirably would be used.

Different a-pels—even adjoining a-pels—on the card may have entirely different reflectance curves. Such differences can be induced by the manufacturing arrangement. In an extreme case, the card can be hit with a meat tenderizing mallet—imparting a marked surface texture to the card. Other arrangements for making the reflectivity curves relatively more chaotic can of course be used.

Reflectance characteristics can also be tailored by choice of materials. Some materials will generally exhibit relatively diffuse reflectance characteristics (e.g., floodlight-like 2D albedo profiles). While such materials can be used, it is preferable to identify materials that tend to have less-diffuse reflectance attributes, so that the maxima from each a-pel can more readily be defined.

In alternative arrangements, each of the oblique card images captured by apparatus 20 and reading station 30 can be normalized to their original rectilinear shape and their original scale, prior to estimation of the 2D albedo map. Again, this can be done by reference to the watermark calibration information embedded in the card.

A refinement may be made to the watermark-based image registration processes described in the cited patent documents, above. Normally, these processes produce an estimate of parameters that characterize the affine distortion of an image. The image is then processed to counter-act such estimated distortion, and the watermark payload is then read.

This may be refined as follows: instead of using just the original estimate of the distorting parameters, try perturbing these estimates slightly. For each perturbed set of estimates, counter-distort the image accordingly, and sense the strength of the watermark payload signal. It may be found that counter-distorting with one of these slightly-perturbed distortion estimates yields a stronger watermark payload signal than occurs using the original distortion estimate. In such case, the perturbed estimate more accurately characterizes the distortion.

By use of such refinement, still more precise determination of card position/orientation may be achieved (e.g., angular resolution on the order of a sixtieth of a degree may be obtained).

The Bayesian engine 21, at one level, simply checks the albedo data provided from reader station 30 with albedo data corresponding to one or more cards earlier characterized by apparatus 20 and stored in database 17. One check, as noted, is correlation. This can comprise, e.g., computing a dot product between two albedo maps represented in a zero-mean version. (E.g., each set of albedo data can represent leaning of the maximum reflectance vector in the east/west dimension (tilt) as −1 for west, and 1 for east. Likewise −1 for north and 1 for south. If there is no correlation between the albedos, the sum of such products will tend towards zero. If there is correlation, the prevalence of same-sign products will cause the sum to increase. This correlation will be apparent even if 95%-98% of the a-pel reflectivity characteristics are changed, e.g., by wear, during the card's service life. Those changes will generally be random; correlation of the remaining 2%-5% will establish the genuineness of the card.)

The albedo data sensed for a particular a-pel might also be processed in connection with a "confidence" factor, e.g., ranging from 1 to 5 (maximum confidence). In the example given above, in which the sensed albedo "lean" from each pel is quantized as being in one of four quadrants (I-IV), the confidence factor can be less if the lean is slight, and more if the lean is great. (More sophisticated confidence metrics can of course be employed.)

Table 1 shows the respective quadrant into which each of plural a-pels "leans":

TABLE 1

| I   | III | III | II  | IV |
| --- | --- | --- | --- | --- |
| IV  | I   | I   | II  | III |
| I   | III | II  | IV  | IV |
| I   | II  | IV  | I   | II |
| III | I   | IV  | I   | I  |

Table 2 shows the corresponding "confidence factors" for each a-pel:

TABLE 2

| 2 | 3 | 2 | 4 | 5 |
| --- | --- | --- | --- | --- |
| 2 | 3 | 3 | 1 | 2 |
| 4 | 5 | 1 | 2 | 3 |
| 4 | 2 | 4 | 3 | 3 |
| 5 | 2 | 3 | 4 | 1 |

These confidence factors can be used to bias the weight given each of the respective a-pel data, in identifying a reference card with the closest match. Perhaps the simplest biasing function is simply to discard all of the a-pel data that does not have a confidence of 'V.' Such a filtered set of a-pel data is shown in Table 3:

TABLE 3

|   |   |   |   | IV |
| --- | --- | --- | --- | --- |
|   |   |   | III |   |
|   |   | III |   |   |

Thresholds other than 'V' can, of course, be used.

In slightly more sophisticated arrangements, a-pel data for all pels having confidence of II or more are used, and the matching algorithm weights the degree of a match in correspondence with the confidence factors of the a-pels used in the analysis.

The Bayesian engine can consider further factors. For example, it may, over time, learn that certain individuals present their card along a "swoop" path that seems to have certain consistencies. Detection of a path following this expected pattern can tend to affirm that the card is being used by its authorized owner. Marked difference from such an expected swoop pattern may prompt the reader to have the user repeat the card presentation, or otherwise focus further inquiry on the user.

In some arrangements, the operation at the database involves retrieving the albedo data previously stored for a particular card, and comparing it with data sensed from a reader device—to ensure they correspond in an expected manner. If so, the card is confirmed to be the same physical card from which the albedo data was originally measured.

This sequence of operation is used, e.g., when a tentative identification of the card can be made, e.g., by reference to a name or license number printed on the card, or encoded thereon in machine-readable form. This tentative identification is then used to identify one particular set of albedo data in the database for comparison.

A more complicated situation arises when no tentative identification of the card is made before consulting the database. In this case, the task is to identify a "best match" between the albedo data derived from data sensed at the reader device, and sets of albedo data earlier stored in the database.

Art known from other disciplines can be applied in this undertaking, such as "robust hashing" art known in audio/video fingerprinting and elsewhere, and associated database search optimization techniques. For example, it is not necessary to check the new set of sensed albedo data against all of the old albedo; certain old data can be almost immediately excluded from consideration (e.g., by techniques such as database pruning). The albedo data can be distilled into a smaller representation, which is robust against many corruption mechanisms. Such techniques, and other useful technologies, are detailed in WO02/065782, US20060075237, US20050259819, and US20050141707.

Different albedo maps can also be characterized for different spectrums and/or polarizations of illumination.

The assignee has run tests, using a robot-controlled test jig, at two discrete angles of tilt in the y direction, covering −10 to 10 degrees at one degree increments in the x-direction. Plural seemingly-identical demonstration driver licenses of two different designs have been employed. One license design is particularly interesting because it is laminated with the 3M Confirm laminate, which is comprised of little beads, which serve as wobble randomizers.

The per pixel luminance measurements show consistency between images captured at a given tilt angle and position on the robot mount. Also, the luminance measurements vary with tilt angle and position on the card (pixel number). When a new set of captures are taken of a different but visually identical card, the per pixel luminance measurements at a specific tilt angle differ from those of the first card.

In the arrangements detailed above, the albedo function is generally static. However, it is possible for the object's albedo function to be changed (either at the time of initial manufacture, or subsequently).

The simplest arrangements allow for the albedo data to be changed once. Various chemical formations (e.g., photographic emulsions, photoreactive inks, etc.) change state in response to particular stimuli (illumination, chemical, thermal, etc.) If a card is provided with such materials (e.g., on the surface, or embedded within), stimulating same can induce a change that affects the albedo function.

One particular arrangement employs a card having photoreactive ink, illuminated with a laser via a micromirror array (perhaps up to 10-50 million mirrors). By controlling the micromirror orientations, regions of the card are illuminated, or not, by the laser light. Corresponding changes are thus induced. (The micromirrors can be controlled so that laser light exposes some regions for different time periods than others—further tailoring the change to the albedo function.)

Another arrangement employs a chemical composition that reacts to laser illumination at a particular wavelength by producing a broad albedo peak in the direction from which the illumination is applied. Desirably, illumination at a different wavelength removes this effect, e.g., restoring the surface to a quasi-"virgin" state, or causing a random albedo response, or a peak in a different direction.

Yet another arrangement employs a material that changes its optical index of refraction following exposure to a given chemical compound, such as water or a solvent. Such a material—spanning the card surface—may be spritzed with liquid (e.g., with a mist or aerosol spray) to change its optical properties. Some such materials are described, e.g., in Kim, Singh and Lyon, "Label-Free Biosensing with Hydrogel Microlenses," Angewandte Chemie International Edition, Volume 45, Issue 9, Pages 1446-1449, 2006.

In each of these arrangements, although only a single state change is usually possible, several successive generations of data can be induced by applying the changing mechanism sparingly—changing only a subset of the a-pels (often a random subset) each time. For example, the liquid spritzing in the foregoing example may be light enough to alter just 10% of the a-pels. Even if performed 10 times, further changes may be subsequently achieved since—statistically—an action that leaves 90% of the a-pels unchanged, if repeated 10 times, still leaves about 35% of the pels unchanged. The other change-mechanisms can likewise be applied to a subset of card features.

Such techniques can be incorporated in the work flow of a card issuance system, processing cards either before or after variable data (e.g., name, photo) are applied.

Other arrangements allow the albedo function to be changed virtually without limit. Consider, for example, a card that has a textured laminate, comprising micro-droplets of clear thermoplastic that is essentially rigid at temperatures up to about 150 F-250 F, but that becomes pliable above such temperatures. Such droplets may originally be uniform in shape (e.g., hemispherical). However, such a card can be heated to the point the droplets become pliable, and a randomly textured medium (e.g., plate, roller-wheel, etc.) can then be impressed into the laminate surface, causing the droplets to deform in random ways. When cooled, the card will have a radically different albedo profile than formerly. The process can be repeated as many times as desired. (A laminate without micro-droplets, but simply comprising a layer of generally flat thermoplastic material, can similarly be employed.)

Instead of impressing the laminate with a physical texturing medium, the laminate may be spot-heated, e.g., using a raster-scanned CO2 laser—pulsed in a random (or a controlled) manner. Temperature differentials induced by such technique can cause the plastic material to deform.

Figure 13A:
FIG. 13 shows how microdroplets of thermoplastic resin on a driver license laminate may be heated by an obliquely applied laser source, applied from different directions, to reshape the laminate surface, and thus the license's albedo function.
Figure 13B:
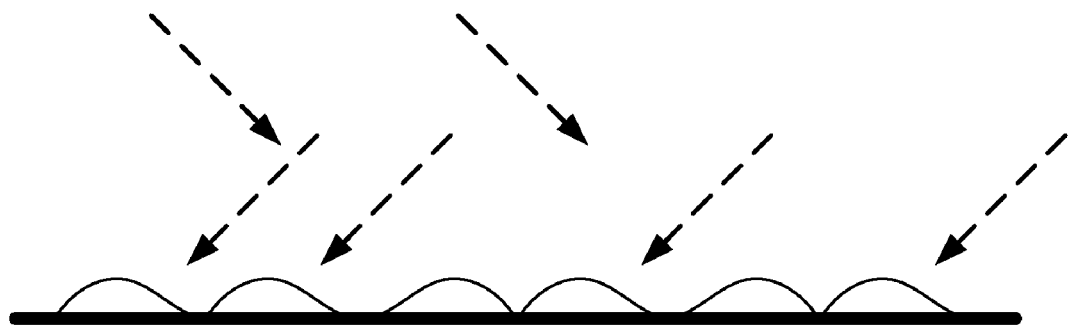

In one particular arrangement, a pulsed laser obliquely illuminates a laminate having microdroplets, as shown in FIG. 13. By illuminating the droplets from different directions, different deformities can be induced. This can be effected by using plural lasers, or with a single laser and a mirror arrangement (e.g., an electronically-steerable micromirror array). Or by use of a single laser, and moving the card, etc.

Instead of illuminating the plastic material from different directions to yield differently-shaped distortions, the plastic may be illuminated from the same direction, but for different periods of time. Other such arrangements will be evident to the artisan.

Still another arrangement bonds a micromirror array/microlens layer onto a card substrate. (The lenses can be movable with the mirrors, or fixed.) Instead of being electronically steered, the micromirrors can rest on microdroplets of deformable plastic, and point in a direction dependent on the shape of the respective underlying microdroplet. The mirrors can be relative transparent at infrared, allowing emission from a CO2 laser to heat the droplets of deformable plastic through the mirror elements. By heating the microdroplets from different directions, and/or for different times, the directions in which the mirrors points can be varied and controlled. Such a material can be "written" from one angle, and "erased" from another (and read straight-on).

Yet another arrangement places a CCD lens array atop a photo resist layer, on a card. The card can be read from one angle, and written from another (and read straight-on).

A point-of-sale terminal can illumine the card at the angle necessary to read the data.

In still other arrangements, a card may be re-shaped without arrangements as elaborate as detailed above. A card may simply be passed through a feeding mechanism that impresses a shaped roller against its face. (A simple arrangement is a sand paper-roller.) Even without elevating the temperature of the card, its albedo function may be altered.

Still other arrangements employ intaglio techniques (either inked, or inkless) to shape the surface of a medium in a desired fashion. Such techniques are known to the artisan from references such as Deinhammer, "The Implication of Direct Laser Engraved Intaglio Plates on Banknote Security," SPIE Vol. 6075, February, 2006, as well as US patent documents U.S. Pat. Nos. 6,840,721, 20030145747, 20040025728, 20040232108, 20050072326, 20050115425, 20050139100, 20050193909, and 20060151989, and international patent publications WO05/002869 and WO06/045128.

The foregoing and other techniques allow shapes including Morse topologies to be formed on an object. Morse surfaces can be used to tailor directional albedo in arbitrary fashions (e.g., by changing the elevation of topological peaks, changing the position of saddle points, changing the depths of local depressions, etc.). (C.f. Milnor, "Morse Theory," Princeton University Press, 1963, ISBN 0-691-08008-9; and Zomorodian, "Topology for Computing," Cambridge Monographs on Applied and Computational Mathematics, 2005.)

Metameric inks, whose response decays or changes over time, can be employed to introduce a temporal variability to the wobble response. Thermics provide another dimension, varying the outputted response in response to temperature. Different directional albedo signals may thus be sensed in different domains, e.g., luminance, red, green, blue, metameric, etc.

By such technologies, data densities on the order of up to 10,000 Morse-els per square inch may be achieved (homage to Morse). The directional albedo (luminance) of each element can represent on the order of 2-8 bits per data from angle alone. The other dimensions of data provide still more bandwidth.

In still other arrangements, the albedo function of a surface is varied not by application of physical or thermal stimulus, but rather by electrical or molecular changes that serve to vary local reflection.

Altering the albedo function of a card can be done each time the card is involved in a transaction, or only at certain times. A point-of-sale transaction terminal can include components for reading the albedo function and for changing the albedo function, so that a read-modify-reread sequence of operations can be performed. (The data collected in the 'reread' operation can be stored locally or centrally for reference, e.g., used in a subsequent read operation to verify the card.)

The albedo function can also be a function of the ink used to print the card. For example, pearlescent or metameric inks can be used. Magnetic inks can also be used to impose some directionality (which may be random) on the illumination reflectance profile.

More advanced materials can also be employed, such as "quantum dots" (semiconductor nanocrystals). Quantum dots are available commercially from vendors including Evident Technologies (Troy, N.Y.), UT Dots, Inc. (Savoy, Ill.), and American Dye Source, Inc. (Quebec, Canada). They can be incorporated, e.g., in bead or dust form, into inks, plastics, and coatings used on licenses. These materials exhibit a narrow and customized emission spectrum, with an emission amplitude that is dependent on excitation wavelength. Such materials have known applications in anti-counterfeiting. As explained at the Evident Technologies web site:

> Two critical aspects of quantum dots give them the ability to act as an encrypting device for anti-counterfeiting: their narrow and specifiable emission peaks, and their excitation wavelength dependent emission intensity. With these traits, several different sizes (and therefore emission wavelengths) of dots can be combined with several different wavelengths of excitation light in order to create an almost infinite variety of emission spectra. Each of these spectra correspond to one coding combination, which can be made as arbitrarily complicated to duplicate as the encoder wishes. This process works as follows.
>
> Each quantum dot size corresponds to a given emission peak. If dots with different emission peaks are mixed together in known quantities, the resulting emission spectrum contains each emission peak present at some measurable intensity. This intensity will be dependent on both the quantity of dots present and the excitation intensity (or intensities, if several sources are used). By fabricating materials containing predetermined amounts of quantum dots which emit at arbitrary wavelengths, and then establishing their emission spectra at arbitrary excitation wavelengths, one can create a "code" based on the relative intensities of emission peaks. For example, if one combines equal amounts of 1000 nm, 1500 nm, and 2000 nm emission dots, and excites them at 800 nm; it would yield a different spectral code than unequal amounts of 1100 nm, 1600 nm, and 2100 nm emission dots excited at 900 nm. By changing the number of dots, their individual concentrations, their emission peaks, or their excitation wavelength, one can create and record a nearly unlimited variety of different spectral codes which can be easily inserted into plastic sheaths, inks, dyes, fabric, or paper, allowing quantum dot anti-counterfeiting encryption to go anywhere.

In a point of sale terminal that illuminates—with a particular illumination spectrum—a card having quantum-dots, the resulting emission peaks can be detected by the terminal and employed as a form of machine-readable data—just like bar codes, RFIDs, digital watermarks, etc. The data thus represented can be employed in the various applications known for such other machine-readable data, including use in conjunction with other machine-readable data conveyed by the card, in cryptographic key applications, as a fingerprint, etc.

One particular arrangement employs several layers of quantum dots, each layer having different characteristics (e.g., emission spectra). The layers are separated by (or include) photoreactive layers that can be made successively transparent by appropriate stimulus.

From the top layer of quantum dots, a first characteristic spectra is emitted (a simple example may be pure red light) in response to a particular illumination. If the photoreactive material beneath (or around) the first layer of quantum dots is made clear, the quantum dot illumination also extends down to the buried, second layer. Its different emission spectra (e.g., blue light) changes the net spectra sensed from the card. Likewise, if the photoreactive material beneath (or included in) the second layer of dots is made clear, the quantum dot illumination extends down to the buried, third layer. Its emission spectra (e.g., yellow light) combines with that of the other layers to result in a third, unique, net emission spectra. The varying emission spectra can be sensed from the card (e.g., in a simple arrangement, as 8-bit data from red-/green-/blue-filtered CCD elements), and the resulting data can serve as a changeable (renewable) key, with well-known cryptographic benefits.

A similar arrangement can include two layers of quantum dots, separated by an intervening layer that is originally transparent, but which can be made relatively opaque by application of stimulus (e.g., laser energy in a certain band) thereto. (Or, the photosensitive material can form part of the layer in which the dots are included, instead of comprising a separate layer.)

By arrangements such as the foregoing (which may be combined), the wobble function of an object may be tailored as desired. Thus, instead of an uncontrollably random function, a controlled (and optionally pseudo-random) function may be achieved.

Exercising control over the wobble function allows known information-theoretic principles to be applied, enabling the wobble function to represent a desired payload that can be reliably detected despite physical corruption of the object and distortion of individual wobbles.

One such principle is use of error correcting codes, such as turbo coding, BCH coding, Reed-Solomon block codes, convolutional codes, etc. Such techniques rely, e.g., on oversampling, i.e., representing N bits of payload data as M bits of signal, where M>N. The redundancy inherent in such arrangements allows errors to be noted and corrected. Such techniques can also employ likelihood measures—indicating the relative probability that a given bit has a given value (akin to the confidence factor tables presented above).

Another principle that can be brought to bear is predictive filtering. Such techniques are taught, e.g., in U.S. Pat. Nos. 7,076,082 and 6,614,914. In one particular embodiment, a 3×3 region of a-pels is considered. In normal media, the wobble of the center a-pel may normally be expected to be correlated to the wobbles of the 8 surrounding a-pels. If the vector average of these surrounding a-pels is calculated, the result can be used as a baseline against which the wobble of the center a-pel can be judged for variance from this natural mean. By such technique, signals corresponding to the deliberately-induced wobble features can be raised out of the "noise" of the (typically lower frequency) wobble characteristic that may naturally occur in a medium.

Using the cited techniques, a card having 50,000 virtual a-pels arrayed across its surface may reliably convey a key code comprising, e.g., 500-5000 bits or more. Such key codes can be used in myriad known manners, some of which are detailed in the references cited at the beginning of this specification.

One particular application of wobbles is in challenge/response systems. The goal of such systems is to render useless any knowledge that an attacker may glean through interception of communications between parties. This is traditionally accomplished with one-time passwords. One of approach (of many) to the construction and use of one-way passwords is to use a challenge and response system. Traditionally, three components are used on the client side of such systems: a base secret, a random challenge, and a hash/encryption function (or other mathematically one-way function).

A challenge is issued by the authenticating party. The client combines the challenge with the base secret and runs the result through a one-way function. The resulting output is transmitted (e.g., back to the authenticating party) for validation. The recipient of the output performs the same calculation, and compares the calculated and received results. Through such use of the one-way function, the base secret is never transmitted in the clear between the parties.

Employing wobbles, the physical card (or other object) can serve as the base secret and/or the one-way function. The random challenge can consist of an instruction to image the card under conditions of specific illumination, position, etc. A sample authentication scenario may proceed as follows:

1. Server issues a challenge to the client (rotation of token ... say 45 degrees);
2. Client communicates the challenge to the end user ("Hold card at approximately 45 degrees"); user images the rotated card;
3. Client reads a watermark from the card to determine card's rotational alignment, and senses wobble signals; resulting wobble data is sent to the server;
4. The server, based on wobble measurements earlier taken from the card, determines the wobbles that should be sensed from a card at the specified rotation;
5. The server compares the results received from the client, versus those it calculated; if they correlate as expected, the client is authenticated.

It will be recognized that if the wobble data sent from the client is of a coarse "quadrant" variety (e.g., as explained in connection with the tables above, wherein the lean of the wobble is identified within one of four quadrants), then rotating the card even a fraction of a degree causes certain of the wobble vectors to progress into the next quadrant—but not others. The server—with its more accurate quantification of the wobble directions—can accurately model which wobbles will transition into each quadrant, for any given rotation. But interception of one coarse wobble signal does not allow an attacker to predict the signal when the card is slightly rotated. (Of course, rotating 90 degrees should cause each wobble to progress into the next quadrant.)

The just-detailed arrangement requires issuance of a specific challenge to the user, and requires the user to hold the card in an appropriate fashion. The "S/Key" challenge and response protocol (sometimes known as Lamport's scheme, and commonly used as a onetime password system) eliminates this communication, and instead operates on succeeding hashes to be created from a common base secret. As one work has explained:

The [S/Key] technique uses a sequence of hashes, each computed from the previous one in the sequence. The server stores the last hash in the sequence. To log on, the client provides the next-to-last hash in the sequence as a one-time password. The server takes the client's one-time password, hashes it, and compares it to the stored hash. Both should match. Then the server replaces the hash in the client's password entry with the password just provided.

In the case of wobbles, before a card (or other token object) is issued to the user, it is configured to encode a large number of temporary passwords, all calculated off the base secret. (Once the passwords are used up, the card can be disposed of.) Each unique signature calculated from the wobbles is another one-time use password calculated on the base secret (the construction of the card).

At first blush, there may seem to be no significant difference between the two techniques, as a challenge in the first is equivalent, in the second, to needing to know which password in the sequence needs to be submitted to the server for authentication.

By loosening the definition from "password in sequence" to "an unused password," then the instructions ("challenge") to the end user becomes the much simpler "wave the card in front of the camera" set.

Thus, in the simplest embodiment, the client would pass either all the observed frames, or calculated wobble vectors, to the server.

An optimization to this is, at the time of session initiation with the server, the server transmits all positions (based on the watermark) that have been used. This allows the client to provide better feedback to the user during the validation step.

In embodiments in which a cell phone device (which term is used to encompass devices such as PDAs, iPhones, Blackberries, etc., whether communicating over a cell network, or WiFi, or WiMax, or Bluetooth, or otherwise) is used as an optical sensor, the wobble data thereby acquired can be used in conjunction with other operations performed by the device. For example, it can authenticate the cell phone to conduct a particular transaction, serve to enter a password to gain access to a protected network domain, authorize use of a user's credit card data, etc.

FURTHER DISCLOSURE

A sample embodiment makes use of the 2-Pi-steradian albedo—to use the 'proper' science phrase—better known as the directional reflectance profile—for each and every resolution element or local group of resolution elements on a card. At a reading station, a card is moved in front of a sensor, presenting the card from different angles, as opposed to being flatly scanned on a scanner.

Each square millimeter of the card, for example, has its commonly understood "grey value," "density," "reflectance," etc. This common understanding is an approximation to the (spectral)-directional-albedo profile. Sophisticated models often distinguish between objects which are illuminated in a diffuse "from all directions" type of lighting source, and the more special case where an object is being illuminated from a specific angle or otherwise selectively as a function of angle. The latter case thus has two forms of directionality: source direction and reflective direction. The resultant "albedo map" is thus a function of 4 dimensions: the reflectance of a unit of light energy transmitted from a given 2D direction and detected at a separate 2D direction.

The distinction between coherent (e.g., laser) versus incoherent illumination may be included for special situations, but the case of coherent light brings with it "interference" which modulates these directional albedo functions at very fine directional scales. In the present discussion, coherent light illumination isn't considered (although it can certainly be used in various embodiments). Instead, the exemplary arrangement focuses on low end cameras in effectively diffuse illumination situations.

Another special case in all of this is 3M's retroreflective technology, which viewed in the above 4D description is the 4D albedo map where the reflectance is '1' for all 4D points where the first two coordinates are identical to the second two coordinates, and '0' everywhere else. No real document or physical system approaches this ideal.

In a forensic setting, where lighting can be controlled as to affect all 2-Pi steradian angles of illumination on an object, and likewise a suitably distant (say 2 meters away) high-quality camera can separately take images of the illuminated object from all 2-Pi steradian angles (independently), an empirical set-up is thus established that can sample the 4D albedo map for any given object. Practically, one would need to move a light source to successive given directions relative to the object, where at each illumination direction the camera is moved through all of its sampling directions. A mere 32 illumination directions matched to 32 detection directions gives 1024 high resolution images to be taken for what amounts to be a fairly coarse sampling of the full 4D albedo map.

For most low end camera applications, we can greatly simplify our forensic lab and the subsequent discussion by either accepting generally diffuse lighting as the standard illumination mode, or perhaps boil down illumination to six categories: generally diffuse and five semi-diffuse from straight-on, up, down, left and right. The six-mode approach should be adequate for almost all general-low-end-camera applications—possibly even a bit of overkill.

So, proposition number one is that in a forensic lab with a good 12-bit grayscale camera sampling at, say, 128 different directions on any given single illumination condition, identically produced cards will nevertheless give rise to quite distinguishable albedo maps simply due to manufacturing processes involved with the stock, printing, laminates, etc. If this is not the case, it should not negate the overall approach described here, but it will possibly make it more challenging as an engineering matter. Be this as it may, albedo map "variational differences" on the order of at least a few percent if not 5 to 10 percent should be expected and readily detectable. "Variational" refers to wobbles as a function of read-angle, and is deliberately an informal and secondary term, where the main point is that the maps are sufficiently different.

Assuming the forensic lab albedo map differences are confirmed across a wide range of examples, this leads to the first test for garden variety cameras: by waving two identically-produced "regular-old" cards in front of a camera in a controlled, reproducible way, ensuring at least a 20 degree read-angle swath, will one card consistently produce a data set which is distinguishable from the other, where for example 15 frames of image data are collected? The answer is expected to be 'yes,' but it would not be surprising if the difference was so slight that only carefully controlled conditions applied multiple times would be necessary to meet basic distinguishability statistics. The plausibility argument that there will be meaningful signal gets down to the fact that some ten or twenty thousand effective locations on the card would be sampled 15 times each, producing a lot of data for one binary decision: same or different. This baseline scenario ultimately boils down to straightforward Bayesian decision statistical descriptions.

How might such an arrangement be hedged? A first line of hedge is to search for manufacturing methods which enhance the resulting Bayesian statistics, period. Things as simple as loosening the tolerances on laminate thicknesses is but one simple and potentially powerful experiment. Other loosened tolerances, and introduction of random functions, could similarly be used, alone or in combination—many at low or no cost (or effecting a cost savings). Skipping ahead, one would hope that two or three key methods could start to make the Bayesian "swipe signatures" (if you will) substantially and reliably different from each other.

Next up is the hedge-of-hedges, represented in the extreme by such things as the 3M retroreflective materials. The key concepts here are "by-design" and some position on the "no-cost to costly scale." The general game here is to continue to enhance the Bayesian properties, while now beginning to pay more attention to angular wobble properties and how they relate to such loose specifications as "minimum 20 degree angular presentation of the card." Also, alluding to how camera data needs to be captured, compressed and shipped to some trusted decision unit, these practical considerations have to be taken into account as by-design albedo-map properties are created and tested (and obviously taking into account cost in all its various forms).

This immediately preceding discussion presumed the "two identical cards presented to a camera in a reproducible, controlled manner." This is obviously not how cards will be used, but it was important to establish the baseline differences between otherwise identically produced cards.

So now we move to normal usage. Presumption number two is that kids to grandmothers can easily be taught (virtually entirely by tactile experience) to present cards to cameras within some technically defined specification on distance, angular movement, speed, number of captured frames, etc. User testing should be able to establish "99% behavioral bounds" which then become the hard targets that engineers treat as design gospel and Bayesian constraints. Normal usage will include the six modes of lighting conditions, the specs of any given camera, the numbers of frames acquired and the above-defined limits of behavioral bounds.

A digital watermark, e.g., as detailed in U.S. Pat. Nos. 6,614,914 and 6,947,571, will provide the informational basis for precise 6 dimensional measurement of the movement of a card in front of the camera: X, Y, Z, pitch, yaw, roll. The basis is thus formed to uniquely determine how our ten to twenty thousand albedo-beacons travel through space and which read-angle is being presented to any given frame. We have our guide to map any given movement back into a card's unique albedo map, forming a comparison between a live event and a re-enacted trace through a stored, trusted map.

At all but an extreme theoretical level, we're at a pretty good point right here. All grandma may be doing is sending instance after instance of these ~20K by 15 albedo swaths back to a trusted decisionmaker for adjudication. The very low-end nature of the camera will ensure that these essentially randomly-complicated and very subtle signatures are quite buried in various noise and distortion soups, a first hint at what's good for the decisionmaker (because we've already designed in plenty of signal in the cacophony of noise) and problematic for the would-be counterfeiter. The allusion to "random" refers to the idea that the wobbles will be fairly "random about the Lambertian-profile expectation" in and around the straight-on to 20/30/40 degrees off-angle directions. The Lambertian-profile is the one you would expect on average from a normally reflective surface. The general notion at this point is that this card can be presented thousands of times, each time producing essentially new data blobs.

So we next consider the attacker with a well-equipped lab.

Will such an attacker be able to discover and record the unique albedo map of a given card, given the possession of the physical card? Of course . . . they can rig up a comparable forensic lab set-up. The practical issue gets down to how long does someone need access to a card in order to gather sufficient forensic data. Certainly longer than the card-swiping-in-the-pocket waiter at the fancy restaurant; but a half-minute in the process outlined above, which characterizes the card at the DMV at the time of its issuance, will do.

Will a data-tapper be able to tap the unencrypted data blob feed from hundreds of presentations of the card and slowly be able to recreate the unique albedo map of the card? Of course, assuming they also are tapping the watermark-provided 6D swath vector as well, or use some other form of 6D registration in order to form a stable basis to start averaging the albedo map. With enough presentations (along with reliable 6D data), the lower frequency albedo map data (wobbles) will begin to show up.

So, physical possession of the card, as well as tapping 6D-enabled-hundreds-of-presentations-unencrypted-datablobs will both enable sleuthing of the card's albedo maps. Let's call this entity the "crude-sleuthed-map" or CSM.

The next question is, given this CSM knowledge, what can the rogue do with it? Can they physically reproduce a card that sufficiently mimics the map so as to fall into the industry standard Bayesian decision statistics (which would be a published standard by a decisionmaker or decisionmaker classes)?

Data-wise, they will clearly be able to simulate a low-end camera, impress the CSM onto that data, package it up and ship it to the decisionmaker as if they were grandma doing it. They could pseudo-randomize presentation 6D swaths as well, new instances of camera noise, even lay down a base layer of a "nearly identical" card data replete with digital watermarking data, then overlaying the CSM layer. One can imagine a fair amount of sophistication in simulating the presentation of a card to a camera, given the CSM. In any event, this one needs to be clearly flagged as a usage-model dependent attack well worth fully exploring in each and every situation, market, application, whatever.

Certainly there are other kinds of data-domain-only attacks that need to be defined, elucidated, studied, counter-attacked and catalogued. For instance, where does threshold attacking of the Bayesian decisionmaker fit in, if at all? It is unclear if you will ever get a "yes" in the first place from a decisionmaker if one doesn't have the card or the CSM, or maybe you get a lucky "yes" every billion tries and this becomes the seed of a threshold attack? Then there's the whole question of the security of the decisionmaking methods, systems, networks, etc., which all seem to fall into application/market specific cryptographic definition and cataloguing.

The question of physical reproduction given the CSM is a more interesting question. Here, the CSM is synonymous with having the card.

To start with, we've already established in our designing above that the same relatively high end and sophisticated machine cranking out card after identical card has no chance of recreating the CSM, even given knowledge of the CSM. (This latter statement is ultimately a function of the design methods we settle on and how "pro-active" they are versus "reactive," but it is a safe presumption that the high end origination machine will not be able to even come close to reproducing the card's albedo map even given full knowledge of the CSM).

So that leaves the option of a specially designed machine that attempts to not only duplicate the nominal identical design of the card, but then impress upon it an artificial duplication of the CSM in a way that does not include additional albedo map wobbles that will throw the reproduced card's CSM out of the published Bayesian bounds.

First of all, building such a machine would be an extreme challenge at many levels, with but one being that the published Bayesian bounds—that the machine ultimately has to answer to—do not need to be limited and can evolve. Probably the biggest challenge would be proactively sculpting the surface properties of a laminate or equivalent, or some 80-90% of the 20K surface elements that is, to the required wobbly patterns of the stored CSM. Even if those wobbles are extremely low frequency and tame, which they generally won't be, it simply is difficult to conceive of a machine which could do this. Mask-based etching? Nano-machines? Micro-surgery equipment?

And then there would be the residual albedo-signature noise to contend with. The original registration of the albedo map of the original card might presumably also characterize the higher frequency statistical attributes of the albedo map. The original stored CSM used by the decisionmaker could capture this data and use various measures as a kind of a simple "check-sum" on a given read, forcing our miraculous machine to first understand these properties as part of the CSM dataset, and then furthermore reproduce these statistics.

In any event, serious study and cataloguing of potential CSM-reproducing machines is required. Presumption number three to this whole approach is that this miraculous machine will, at the very least, be exceedingly expensive, and better yet essentially beyond the reach of current and near-term technology.

So, attack-wise, given knowledge of the CSM, you've got the datawise simulation of a camera presentation and you've got the miraculous but at the very least quite expensive CSM-reproducing machine. Each requires the not so trivial step of gaining knowledge of the CSM.

Going back to the CSM-reproducing machine, at this point might it be equated to the mythical three-embedded-room-deep machine at the NSA which molecularly CATSCANS smart cards in order to sleuth their secrets? It would not be surprising if a proof is established that the technical challenges in creating a CSM-reproducing machine are on the same tall-order scale as creating the machines intended to bust smart cards and other tamper-proof electronics.

CONCLUDING REMARKS

This specification covers a lot of ground—much of it new. The breadth of application of the disclosed technologies is large, as will be apparent to artisans skilled in the field.

For example, it will be apparent to artisans that elements of the disclosed arrangements can be employed in on-line purchasing of goods and services, and on-line bill paying. Application of pseudo random cryptographic keys—of the sort represented by, e.g., wobble data—to such activities are well understood. This is but one of many examples where the present specification enables novel applications.

It is expressly contemplated that the technologies, features and analytical methods detailed in this specification can be incorporated into the methods/systems detailed in the earlier-referenced documents. Moreover, the technologies, features, and analytical methods detailed in those documents can be incorporated into the methods/systems detailed herein. (It will be recognized that the brief synopses of such prior documents provided above naturally do not reflect all of the features found in such disclosures.)

It will be recognized that elements of the arrangements detailed herein can be used advantageously in other contexts. For example, while a directional albedo function has been employed in detailed arrangements, this function has advantageous utility elsewhere. Conversely, alternative implementations using technology detailed herein do not need to involve a directional albedo function.

More generally, it should be recognized that this specification discloses a great number of arrangements and included sub-combinations that are useful and non-obvious apart from the larger embodiments particularly described. Thus, no particular element or act recited herein is believed to be essential to definition of patentable subject matter. Methods and apparatuses in which detailed elements/acts are omitted, or substituted with other elements/acts, are expressly contemplated. Thus, by way of example and not limitation, an identity card is not essential (the detailed embodiments can be practiced, e.g., to identify a particular physical object, such as a wristwatch); an optical sensor is not essential (identification can be based on different physical measurements, such as of acoustical properties); a random track of an object before a sensor is not essential (a carefully controlled track may be employed), watermarked data is not essential (e.g., position—if relevant—can be determined by other means), etc., etc.

Moreover, novelty does not reside only in the overall system, but also in subcombinations disclosed herein. For example, the measurement apparatus of FIG. 3 is believed patentable per se, as is the concept of uniquely identifying an article by reference to its directional albedo function, as well as imparting a deliberately random feature to a license prior to issuance, so too perturbing watermark-estimated orientation data to generate refined orientation data, and likewise weighting wobble data in accordance with a confidence factor in determining a match, etc., etc. (Some such subcombinations are particularly noted in the listing that follows, although such listing is not exhaustive.)

Applicants expressly note that results achieved by certain combinations and subcombinations may be achieved by other combinations/subcombinations that are straightforward to artisans in the field—informed by the teaching of this specification. For example, while this specification teaches that a card may be imparted a random surface texture by hitting it with a meat tenderizing mallet, the artisan will immediately recognize that such a result may be achieved by myriad other straightforward means (e.g., rubbing with sandpaper, laser etching, etc.)

Arrangements using concepts detailed herein can also make use of machine-readable technologies (e.g., bar codes, RFIDs, magnetic stripes, etc.), or can be substituted for such technologies in previously known arrangements.

A few of the novel arrangements detailed herein include:

A. A method comprising: assessing directional albedo data relating to a surface of a first article; and storing data corresponding to said assessment, for later verification of said article.

B. The method A in which said assessing comprises, for each of plural regions on a surface of said article, determining a wobble angle at which reflectance from said article is at a maximum.

C. The method A in which said assessing comprises capturing light reflected from a region of a card towards a first direction, and towards a second direction, and determining therefrom a wobble angle at which reflectance from said region is at a maximum.

D. The method C in which said capturing comprises capturing light using a 2D optical sensor in a camera-equipped mobile phone.

E. The method A that further comprises illuminating the article with diffuse illumination.

F. The method A, that includes assessing directional albedo data relating to a surface of an identification document.

G. A method of issuing driver licenses that includes fabricating a license, and providing same to an applicant, further characterized by, prior to said providing, collecting a unique set of physical measurement data from each license, and storing same in a database, wherein the stored data can later be consulted to identify said license.

H. The method G wherein said collecting comprises capturing information related to topographic minutiae from each license.

I. The method G wherein said collecting comprises capturing light reflected from a region of a license towards a first direction, and towards a second direction, and determining therefrom a wobble angle at which reflectance from said region is at a maximum.

J. A method that includes assessing directional albedo data relating to a first article, and determining—by reference to said data and earlier-assessed albedo data relating to a second article, whether the first article is the second article.

K. The method J that includes: reading a machine-readable identifier from said first article; by reference to said machine-readable identifier, identifying a set of earlier-assessed albedo data; and checking said identified set of earlier-assessed albedo data against albedo data relating to the first article.

L. The method K that includes capturing 2D image data from the first article, and determining therefrom both said directional albedo data, and said machine-readable identifier.

M. A method comprising: assessing directional albedo data relating to an article; and checking data corresponding to said assessment against earlier-stored data, to determine an identity of said article.

N. A method comprising: for each of plural areas on an article, sensing energy reflected therefrom in plural different directions, to determine a direction of maximum reflectance; and by reference to data thereby gathered, identifying a reference set of earlier-stored data corresponding thereto, and thereby identifying the article.

O. The method N that includes sensing energy reflected from an identification document, and identifying the document.

P. A method comprising: sensing an attribute from an object, from first and second different directions; producing data therefrom; and by reference to said produced data, in conjunction with earlier-stored data, making a determination concerning said object.

Q. The method P in which the object comprises several regions, and said sensing comprises sensing light reflected from one of said regions in a first, and in a second, direction.

R. The method P that includes making a determination concerning an identification of said object.

S. The method P that comprises sensing said attribute from an identification document.

T. A method comprising: causing relative movement between an object (e.g., an identity object) and a camera-equipped cell phone; capturing plural successive images of the object from different viewpoints said camera-equipped mobile phone; and by reference to data thereby collected, making a determination concerning said object.

U. The method T that includes making a determination concerning identification of said object.

V. A method comprising: waving an article before a 2D optical sensor device along a random track; and by reference to data produced by said device, making a determination concerning said article.

W. A method comprising: causing relative movement between an identity card and a 2D optical sensor; capturing plural frames of image data during said movement; determining position data for said card for each of plural frames; decoding a steganographically encoded data signal conveyed by said card; and processing said captured image data, in conjunction with said position data, to determine a physical function associated with said card.

X. The method W that further comprises checking previously-stored physical function data with said determined physical function, for correspondence.

Y. The method X that includes, by reference to the decoded data signal, identifying a record in a database purportedly corresponding to said card, and obtaining said previously-stored physical function data therefrom.

Z. The method W wherein said determining position data proceeds by reference to a steganographically encoded reference signal conveyed by said card AA. The method W wherein said physical function has a directional aspect.

BB. A method of issuing driver licenses that includes fabricating a license, and providing the fabricated license to an applicant, further characterized by processing the license prior to said providing, so as to deliberately impart thereto a random physical feature, and storing data related to said feature for later use.

CC. A method comprising: receiving a card, the card having a set of plural physical features that, in the aggregate, define an initial state; applying a stimulus to the card, said stimulus causing plural of said physical features to change, thereby defining a second state of said set of features; and storing data related to said second state.

DD. The method CC that further includes using said second state of said set of features in connection with a cryptographic function.

EE. The method CC wherein the card comprises plural regions, and said set of features comprises a parameter associated with each of said regions.

FF. The method CC wherein said parameters comprise directional albedo parameters.

GG. The method CC wherein said stimulus comprises a physical pressure force, which changes a surface topology of said card.

HH. The method CC wherein said stimulus comprises localized application of electromagnetic energy to certain areas of said card.

II. The method HH wherein said stimulus comprises laser irradiation, applied to said card from a first direction, and further irradiation, applied to said card from a second, different, direction.

JJ. The method HH wherein said stimulus comprises laser irradiation, applied to first positions on said card for a first interval of time, and applied to second positions on said card for a second, longer interval of time.

KK. The method CC wherein said stimulus comprises a liquid sprayed on said card.

LL. The method CC wherein said applying has a random aspect.

MM. The method CC wherein said applying comprises heating the card to return the card to an initial state, and thereafter applying a further stimulus to the card, to cause said set of physical features to change to the second state.

NN. A method of customizing a card comprising: applying laser irradiation to first regions of said card from a first direction; and applying laser irradiation to second regions of said card from a second, different, direction.

OO. A card construction for use with ID documents, the card comprising a substrate and plural layers, at least one of said layers comprising quantum dots, and one of said layers comprising a photoreactive material whose transmissivity is changeable by application of stimulus thereto.

PP. An apparatus comprising: a card positioning system, by which an ID card can be positioned at a known location; an optical imaging system, arranged to capture optical data from a card positioned at said location from plural different directions; and a processor adapted to process data received from said plural optical sensors, and determine therefrom—for each of plural areas on the surface of said card—a wobble angle associated therewith.

QQ. The apparatus PP wherein said optical imaging system comprises plural 2D optical sensors, each with an associated lens, positioned to capture optical information from a card at said location from plural different directions.

RR. In a method of compiling a database useful by an issuer of identity credentials, the method including storing—for each of plural issued credentials—a name of a credentialed person, and an image of such person, an improvement that includes also storing physical minutiae information unique to said issued credential.

SS. A method comprising: capturing image data from an identification document; and by reference to information previously known about said document, characterizing a position of said document in at least three dimensions.

TT. The method SS that includes, by reference to steganographically encoded calibration data conveyed by said document, characterizing a position of said document in at least three dimensions.

UU. The method SS wherein said dimensions comprise at least tip, tilt, and rotation angles.

VV. A card construction for use with ID documents, the card comprising a substrate and at least one layer thereon, characterized in that a layer thereof includes a material responsive to stimulus to change an optical property thereof.

Having described and illustrated various principles of our work by reference to particular examples, it should be apparent that the detailed technology can be modified in arrangement and detail without departing from such principles. Accordingly, we claim all such embodiments as come within the scope and spirit of the following claims and equivalents thereto.

We claim:

1. A method comprising:
    causing relative movement between an object and a camera-equipped cell phone;
    capturing plural successive images of the object from different viewpoints said camera-equipped mobile phone;
    by reference to data thereby collected, determining a physical function associated with the object; and
    making a determination concerning said object, by reference to said determined physical function and previously-stored physical function data;
    wherein said determination is made independently of information about positioning of any illumination source relative to the object.

2. The method of claim 1 wherein said object comprises an identity document.

3. The method of claim 1 that includes making a determination concerning identification of said object.

4. A method comprising:
    waving an article before a 2D optical sensor device along a random track;
    by reference to data produced by said device, determining a physical function associated with the object; and
    making a determination concerning said article, by reference to said determined physical function and previously-stored physical function data;
    wherein said determination is made independently of information about positioning of any illumination source relative to the article.

5. A method comprising:
    causing relative movement between an identity card and a 2D optical sensor;
    capturing plural frames of image data during said movement, said frames including image data corresponding to said identity card;
    determining relative position data for each of plural frames;
    decoding a steganographically encoded data signal conveyed by said card;
    processing said captured image data, in conjunction with said position data, to determine a physical function associated with said card; and
    checking previously-stored physical function data with said determined physical function, for correspondence;

wherein said processing is done independently of information about positioning of any illumination source relative to the identity card.

6. The method of claim 5 that includes, by reference to the decoded data signal, identifying a record in a database purportedly corresponding to said card, and obtaining said previously-stored physical function data therefrom.

7. The method of claim 5 wherein said determining position data proceeds by reference to a steganographically encoded reference signal conveyed by said card.

8. The method of claim 5 wherein said physical function has a directional aspect.

9. The method of claim 5 that further comprises checking previously-stored physical function data with said determined physical function, for correlation.

10. A method that includes:
causing relative movement between an object and a 2D optical sensor;
generating object-related physical function data, said generating including capturing a frame of image data during said movement, said frame of image data including at least some image data corresponding to said object, and determining relative position data associated with said captured frame of image data;
sensing a machine-readable identifier from the object;
accessing a remote data store containing previously-stored physical function data associated with said sensed identifier; and
checking the previously-stored physical function data from said remote data store with said object-related physical function data for correspondence;
wherein said method proceeds independently of information about positioning of any illumination source relative to the object.

11. The method of claim 10 that includes checking the data from said remote data store with said object-related data for correlation.

12. The method of claim 10 in which the object comprises an identity card.

13. The method of claim 10 in which said act of generating object-related data includes capturing plural frames of image data during said movement, and determining relative position data associated with each of said captured frames.

14. The method of claim 10 wherein said capturing a frame of image data comprises capturing with a 2D optical sensor in a camera-equipped telephone.

15. The method of claim 1 wherein said determination is made by a processor, configured in accordance with software instructions, and proceeds with reference to information related to surface topology of the object.

16. The method of claim 4 wherein said determination is made by a processor, configured in accordance with software instructions, and proceeds with reference to information related to surface topology of the article.

17. The method of claim 5 wherein said processing is performed by a processor, configured in accordance with software instructions, and proceeds with reference to information related to surface topology of the identity card.

18. The method of claim 10 wherein said generating is performed by a processor, configured in accordance with software instructions, and proceeds with reference to information related to surface topology of the object.

19. A computer readable medium containing non-transitory instructions for causing a process programmed thereby to perform the following acts:
control the capturing of image data from an article;
process the image data to obtain position data relating to positioning of the article;
by reference to the image data and the position data, determine physical function data associated with the object; and
make a determination concerning the authenticity of the article by reference to said determined physical function data and previously-stored physical function data, said determination being made independently of information about positioning of any illumination source relative to the article.

20. A method that includes:
collecting plural frames of image data of an object, each with a different perspective;
step for checking a match between said object to a reference object, through use of previously-stored physical function data, and independently of information about positioning of any illumination source relative to the article; and
providing an indication to a user if a match is found.

21. The method of claim 20 wherein said step comprises performing a correlation operation using a computer.

* * * * *